United States Patent
Mate et al.

(10) Patent No.: US 12,363,043 B2
(45) Date of Patent: Jul. 15, 2025

(54) PRIORITY APPLICATION AND NETWORK BITS FOR PDU HANDLING

(71) Applicant: Nokia Technologies Oy, Espoo (FI)

(72) Inventors: Sujeet Shyamsundar Mate, Tampere (FI); Kashyap Kammachi Sreedhar, Tampere (FI); Igor Danilo Diego Curcio, Tampere (FI); Serhan Gul, Berlin (DE); Lauri Aleksi Ilola, Tampere (FI); Saba Ahsan, Espoo (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 18/422,113

(22) Filed: Jan. 25, 2024

(65) Prior Publication Data
US 2024/0259319 A1   Aug. 1, 2024

Related U.S. Application Data

(60) Provisional application No. 63/441,222, filed on Jan. 26, 2023.

(51) Int. Cl.
*H04L 47/24* (2022.01)
*H04L 65/65* (2022.01)

(52) U.S. Cl.
CPC .............. *H04L 47/24* (2013.01); *H04L 65/65* (2022.05)

(58) Field of Classification Search
CPC ....... H04L 45/02; H04L 67/12; H04L 45/033; H04L 45/64; H04L 67/56; H04L 67/565; H04L 67/61; H04L 67/63
See application file for complete search history.

(56) References Cited

U.S. PATENT DOCUMENTS

| | | | | |
|---|---|---|---|---|
| 2012/0084212 A1* | 4/2012 | Sinor | ...................... | G06F 30/00 705/300 |
| 2013/0205002 A1* | 8/2013 | Wang | ...................... | H04L 69/16 709/224 |
| 2023/0164081 A1* | 5/2023 | Rossbach | .......... | H04W 28/0263 370/235 |
| 2024/0259319 A1* | 8/2024 | Mate | ...................... | H04L 65/65 |

(Continued)

OTHER PUBLICATIONS

3GPP tR 23.700-60 V2.0.0 (Nov. 2022) "3rd Generation Partnership Project, Technical Specification Group Services and System Aspects; Study on XR (Extended Reality) and media services (Release 18)", Nov. 2022, 266 pages.

(Continued)

*Primary Examiner* — Jerry B Dennison

(74) *Attorney, Agent, or Firm* — McCarter & English, LLP

(57) ABSTRACT

An apparatus may be configured to: receive, from a first user equipment, at least one real-time transport protocol header extension configured to handle at least one protocol data unit, wherein the at least one real-time transport protocol header extension comprises, at least, one or more application controlled bits; determine whether the one or more application controlled bits are valid; and set values for one or more network controlled bits of the at least one real-time transport protocol header extension based, at least partially, on a (Continued)

1600 determine values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension — 1610 transmit the at least one real-time transport protocol header extension — 1620 determination of whether the one or more application controlled bits are valid, wherein the one or more application controlled bits comprise bits that do not overlap with the one or more network controlled bits.

15 Claims, 24 Drawing Sheets

(56) References Cited

U.S. PATENT DOCUMENTS

| | | | | |
|---|---|---|---|---|
| 2024/0259454 | A1* | 8/2024 | Kammachi Sreedhar | .................... H04L 65/70 |
| 2024/0303037 | A1* | 9/2024 | Castro | ..................... G06F 7/523 |
| 2024/0340229 | A1* | 10/2024 | Ma | ...................... H04L 43/0852 |
| 2024/0357106 | A1* | 10/2024 | Mate | .................. H04N 21/6437 |

OTHER PUBLICATIONS

"LS on N6 PDU Set identification", 3GPP TSG SA WG-4 Meeting #121, S4-221244, Nov. 2022, 2 pages.

"Discussion on the usage of RTP/SRTP header and header extension for PDU set/frame identification", Intel, 3GPP TSG-SA4 Meeting #121, S4-221253, Nov. 2022, 5 pages.

"Low Latency, Low Loss, and Scalable Throughput (L4S) Internet Service: Architecture RFC 9330", https://datatracker.ietf.org/doc/draft-ietf-tsvwg-l4s-arch/, Dec. 2023, 28 pages.

"Discussion on cross layer optimization for immersive real-time communication", Qualcomm Inc., TSG S4 Meeting #118-e, S4-220477, Apr. 2022, 3 pages.

"Real-time Transport Control Protocol (RTCP)—Based Feeback (RTP/AVPF)", RFC 4585 Network Working Group, J. Ott et al., Jul. 2006, 51 pages.

"A Transport Protocol for Real-Time Applications", RFC 3550 Network Working Group, H. Schulzrinne et al., Jul. 2003, 104 pages.

"[5G_RTP] RTP Header Extension for PDU Set Marking", Qualcomm Inc., TSG SA4 RTC SWG Post #121 Ad-hoc Call, S4aR230009, Dec. 2022, 3 pages.

Mate, Sujeet Shyamsundar, et al., "Priority Application and Network Bits for PDU Handling", U.S. Appl. No. 63/441,222, filed Jan. 26, 2023, 138 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

FIG. 2A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |           length              |
+-+-+-+-+-+-+-+-+-+-+-+-+-+-+-+-+-+-+-+-+-+-+-+-+-+-+-+-+-+-+-+-+
|                        header extension                       |
|                             ....                              |
```

FIG. 2B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      0xBE     |      0xDE     |          length=3             |
+-+-+-+-+-+-+-+-+-+-+-+-+-+-+-+-+-+-+-+-+-+-+-+-+-+-+-+-+-+-+-+-+
|  ID   |  L=0  |     data      |  ID   |  L=1  |     data...
+-+-+-+-+-+-+-+-+-+-+-+-+-+-+-+-+-+-+-+-+-+-+-+-+-+-+-+-+-+-+-+-+
     ...data    |    0 (pad)    |    0 (pad)    |  ID   |  L=3  |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
```

FIG. 2C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      0x10     |      0x00     |          length=3             |
+-+-+-+-+-+-+-+-+-+-+-+-+-+-+-+-+-+-+-+-+-+-+-+-+-+-+-+-+-+-+-+-+
|       ID      |      L=0      |      ID       |      L=1      |
+-+-+-+-+-+-+-+-+-+-+-+-+-+-+-+-+-+-+-+-+-+-+-+-+-+-+-+-+-+-+-+-+
|      data     |    0 (pad)    |      ID       |      L=4      |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
```

FIG. 2D

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   FMT   |       PT      |          length               |
+-+-+-+-+-+-+-+-+-+-+-+-+-+-+-+-+-+-+-+-+-+-+-+-+-+-+-+-+-+-+-+-+
|                  SSRC of packet sender                        |
+-+-+-+-+-+-+-+-+-+-+-+-+-+-+-+-+-+-+-+-+-+-+-+-+-+-+-+-+-+-+-+-+
|                  SSRC of media source                         |
+-+-+-+-+-+-+-+-+-+-+-+-+-+-+-+-+-+-+-+-+-+-+-+-+-+-+-+-+-+-+-+-+
:            Feedback Control Information (FCI)                 :
:                                                               :
:                                                               :
```

FIG. 2E

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     0xBE      |     0xDE      |            length             |
+-+-+-+-+-+-+-+-+-+-+-+-+-+-+-+-+-+-+-+-+-+-+-+-+-+-+-+-+-+-+-+-+
|      ID       |     L=14      |S|E|D|   RES   |  Pri  |  RES  |
+-+-+-+-+-+-+-+-+-+-+-+-+-+-+-+-+-+-+-+-+-+-+-+-+-+-+-+-+-+-+-+-+
|             COUNT             |              PSN              |
+-+-+-+-+-+-+-+-+-+-+-+-+-+-+-+-+-+-+-+-+-+-+-+-+-+-+-+-+-+-+-+-+
|            PSSize             |             PSSN              |
+-+-+-+-+-+-+-+-+-+-+-+-+-+-+-+-+-+-+-+-+-+-+-+-+-+-+-+-+-+-+-+-+
               ...                             PSSize     ...
+-+-+-+-+-+-+-+-+-+-+-+-+-+-+-+-+-+-+-+-+-+-+-+-+-+-+-+-+-+-+-+-+
|               k               |               r               |
+-+-+-+-+-+-+-+-+-+-+-+-+-+-+-+-+-+-+-+-+-+-+-+-+-+-+-+-+-+-+-+-+
```

FIG. 7

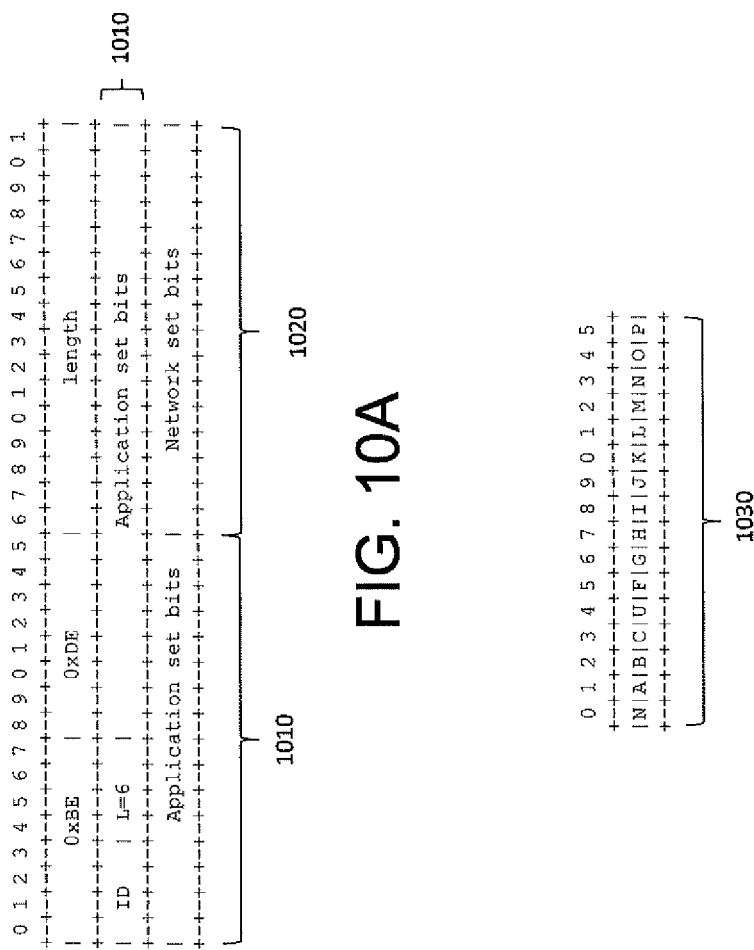

1700

```
┌─────────────────────────┐
│ receive, from a first user │
│ equipment, at least one real-│
│ time transport protocol header│
│ extension configured to handle│
│ at least one protocol data unit,│      1710
│ wherein the at least one real-│
│ time transport protocol header│
│ extension comprises, at least,│
│ one or more application │
│ controlled bits         │
└─────────────────────────┘
            ▼
┌─────────────────────────┐
│ determine whether the one or│
│ more application controlled bits│   1720
│ are valid              │
└─────────────────────────┘
            ▼
┌─────────────────────────┐
│ set values for one or more │
│ network controlled bits of the at│
│ least one real-time transport │
│ protocol header extension │
│ based, at least partially, on a│
│ determination of whether the│
│ one or more application  │       1730
│ controlled bits are valid,│
│ wherein the one or more │
│ application controlled bits│
│ comprise bits that do not│
│ overlap with the one or more│
│ network controlled bits │
└─────────────────────────┘
```

1810 — receive, from a first user equipment, at least one real-time transport protocol header extension configured to handle at least one protocol data unit, wherein the at least one real-time transport protocol header extension comprises, at least, one or more application controlled bits and one or more network controlled bits, wherein the one or more application controlled bits comprise bits that do not overlap with the one or more network controlled bits 1820 — determine whether the one or more application controlled bits are valid 1830 — in response to a determination that the one or more application controlled bits are valid, transmit the protocol data unit to a second user equipment based, at least partially, on the one or more application controlled bits 1840 — in response to a determination that the one or more application controlled bits are invalid, transmit the protocol data unit to a second user equipment based, at least partially, on the one or more network controlled bits

PRIORITY APPLICATION AND NETWORK BITS FOR PDU HANDLING

PRIORITY BENEFIT

This application claims priority under 35 U.S.C. 119(e)(1) to U.S. Provisional Patent Application No. 63/441,222, filed Jan. 26, 2023, which is hereby incorporated by reference in its entirety.

BACKGROUND

It is known, in network communications, to include a header extension for a real-time transport protocol transmission.

FIELD OF EMBODIMENTS

The example and non-limiting embodiments relate generally to protocol data unit priority and, more particularly, to signaling of protocol data unit priority.

BRIEF SUMMARY OF EMBODIMENTS

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: determine values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension; and transmit the at least one real-time transport protocol header extension.

In accordance with one aspect, a method comprising: determining, with a user equipment, values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension; and transmitting the at least one real-time transport protocol header extension.

In accordance with one aspect, an apparatus comprising means for performing: determining values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension; and transmitting the at least one real-time transport protocol header extension.

In accordance with one aspect, a non-transitory computer-readable medium comprising program instructions stored thereon for performing at least the following: determining, with a user equipment, values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension; and causing transmitting of the at least one real-time transport protocol header extension.

In accordance with one aspect, an apparatus comprising: at least one processor; and at least one memory storing instructions that, when executed by the at least one processor, cause the apparatus at least to: receive, from a first user equipment, at least one real-time transport protocol header extension configured to handle at least one protocol data unit, wherein the at least one real-time transport protocol header extension comprises, at least, one or more application controlled bits; determine whether the one or more application controlled bits are valid; and set values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

In accordance with one aspect, a method comprising: receiving, from a first user equipment, at least one real-time transport protocol header extension configured to handle at least one protocol data unit, wherein the at least one real-time transport protocol header extension comprises, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

In accordance with one aspect, an apparatus comprising means for performing: receiving, from a first user equipment, at least one real-time transport protocol header extension configured to handle at least one protocol data unit, wherein the at least one real-time transport protocol header extension comprises, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

In accordance with one aspect, a non-transitory computer-readable medium comprising program instructions stored thereon for performing at least the following: causing receiving, from a first user equipment, of at least one real-time transport protocol header extension configured to handle at least one protocol data unit, wherein the at least one real-time transport protocol header extension comprises, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

In accordance with one aspect, an apparatus comprising: at least one processor; and at least one memory storing instructions that, when executed by the at least one processor, cause the apparatus at least to: receive, from a first user equipment, at least one real-time transport protocol header extension configured to handle at least one protocol data unit, wherein the at least one real-time transport protocol header extension comprises, at least, one or more application controlled bits and one or more network controlled bits, wherein the one or more application controlled bits comprise bits that do not overlap with the one or more network controlled bits; determine whether the one or more application controlled bits are valid; in response to a determination that the one or more application controlled bits are valid, transmit the protocol data unit to a second user equipment based, at least partially, on the one or more application controlled bits; and in response to a determination that the one or more application controlled bits are invalid, transmit the protocol data unit to a second user equipment based, at least partially, on the one or more network controlled bits.

In accordance with one aspect, a method comprising: receiving, from a first user equipment, at least one real-time transport protocol header extension configured to handle at least one protocol data unit, wherein the at least one real-time transport protocol header extension comprises, at least, one or more application controlled bits and bits and one or more network controlled bits, wherein the one or more application controlled bits comprise bits that do not overlap with the one or more network controlled bits; determining whether the one or more application controlled bits are valid; in response to a determination that the one or more application controlled bits are valid, transmitting the protocol data unit set to a second user equipment based, at least partially, on the one or more application controlled bits; and in response to a determination that the one or more application controlled bits are invalid, transmitting the protocol data unit set to a second user equipment based, at least partially, on the one or more network controlled bits.

In accordance with one aspect, an apparatus comprising means for performing: receiving, from a first user equipment, at least one real-time transport protocol header extension configured to handle at least one protocol data unit, wherein the at least one real-time transport protocol header extension comprises, at least, one or more application controlled bits and one or more network controlled bits, wherein the one or more application controlled bits comprise bits that do not overlap with the one or more network controlled bits; determining whether the one or more application controlled bits are valid; in response to a determination that the one or more application controlled bits are valid, transmitting the protocol data unit set to a second user equipment based, at least partially, on the one or more application controlled bits; and in response to a determination that the one or more application controlled bits are invalid, transmitting the protocol data unit set to a second user equipment based, at least partially, on the one or more network controlled bits.

In accordance with one aspect, a non-transitory computer-readable medium comprising program instructions stored thereon for performing at least the following: causing receiving, from a first user equipment, of at least one real-time transport protocol header extension configured to handle at least one protocol data unit, wherein the at least one real-time transport control protocol transmission comprises, at least, one or more application controlled bits and one or more network controlled bits, wherein the one or more application controlled bits comprise bits that do not overlap with the one or more network controlled bits; determining whether the one or more application controlled bits are valid; in response to a determination that the one or more application controlled bits are valid, causing transmitting of the protocol data unit set to a second user equipment based, at least partially, on the one or more application controlled bits; and in response to a determination that the one or more application controlled bits are invalid, causing transmitting of the protocol data unit set to a second user equipment based, at least partially, on the one or more network controlled bits.

According to some aspects, there is provided the subject matter of the independent claims. Some further aspects are defined in the dependent claims.

BRIEF DESCRIPTION OF THE SEVERAL VIEWS OF THE DRAWINGS

The foregoing aspects and other features are explained in the following description, taken in connection with the accompanying drawings, wherein:

FIG. 2A is a diagram illustrating features as described herein;

FIG. 2B is a diagram illustrating features as described herein;

FIG. 2C is a diagram illustrating features as described herein;

FIG. 2D is a diagram illustrating features as described herein;

FIG. 2E is a diagram illustrating features as described herein;

FIG. 7 is a diagram illustrating features as described herein;

FIG. 10A is a diagram illustrating features as described herein;

FIG. 10B is a diagram illustrating features as described herein;

FIG. 17 is a flowchart illustrating steps as described herein; and

FIG. 18 is a flowchart illustrating steps as described herein.

DETAILED DESCRIPTION OF EMBODIMENTS

Figure 1:
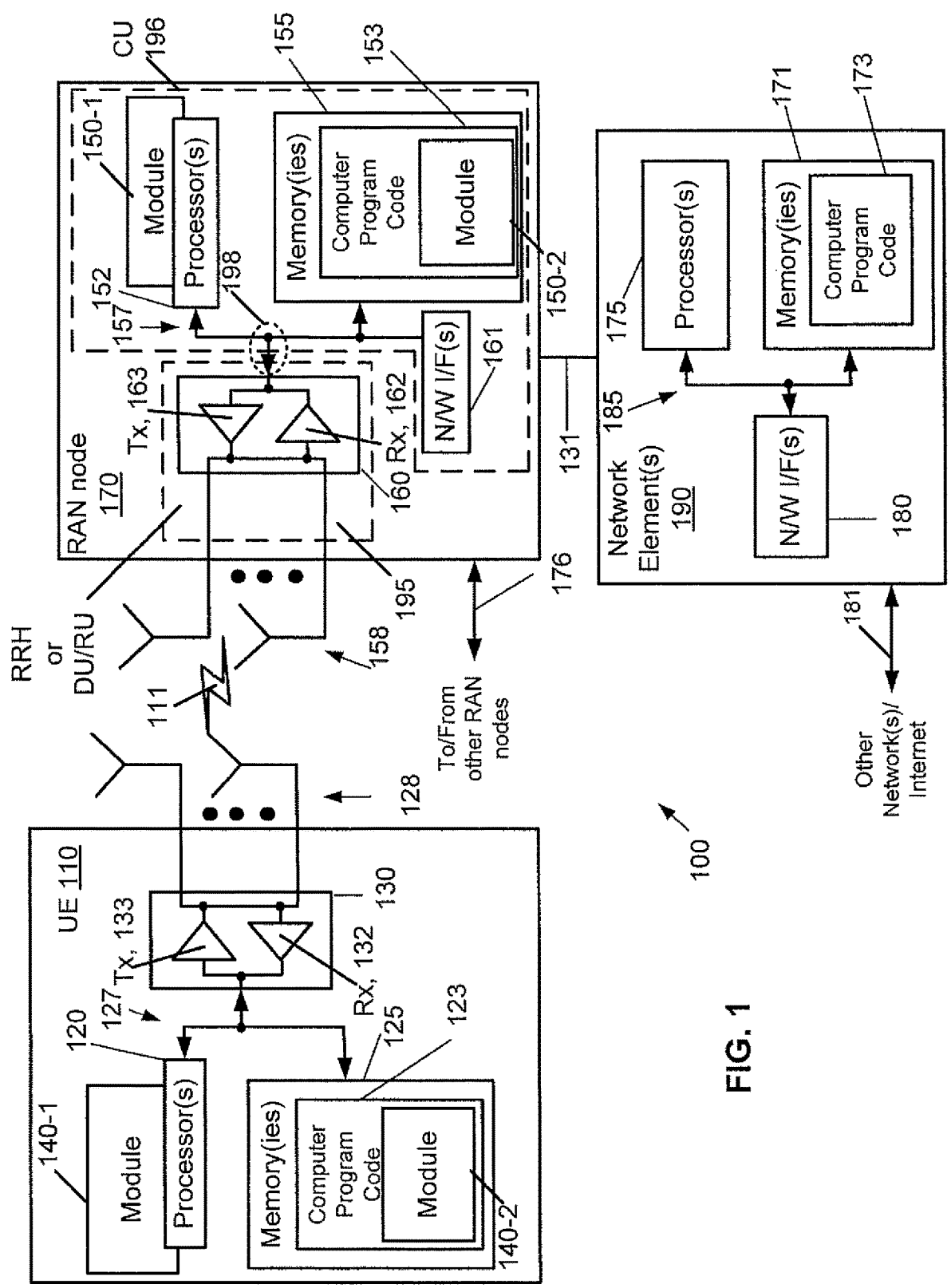
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
5GS 5G system
5QI 5G quality of service identifier
6G sixth generation
ACK acknowledge
AF application function
AMF access and mobility management function
AP access point
AR augmented reality
AS application server
AVP attribute value pair
CDRX connected mode discontinuous reception
cRAN cloud radio access network
CU central unit
DPI dots per inch
DU distributed unit
ECN explicit congestion notification
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FEC forward error correction
gNB (or gNodeB) base station for 5G/NR, i.e., a node providing NR user plane and control plane protocol terminations towards the UE, and connected via the NG interface to the 5GC
GOP group of pictures
GPRS general packet radio system
GTP-U GPRS tunnelling protocol—user data
HARQ hybrid automatic repeat request
HDRLL high data rate low latency
HE header extension
I/F interface
IP Internet protocol
L1 layer 1
LTE long term evolution
MAC medium access control
MME mobility management entity
MR mixed reality
NACK negative acknowledge
NAL network abstraction layer
NAS network access stratum
ng or NG new generation
NGAP next generation application protocol
ng-eNB or NG-eNB new generation eNB
NR new radio
NRI network resource indicator
NTP network time protocol
N/W or NW network
O-RAN open radio access network
PCC policy control and charging
PCF policy control function
PCMU pulse code modulation codec
PDB packet delay budget
PDCP packet data convergence protocol
PDU protocol data unit
PHY physical layer
QOE quality of experience
QoS quality of service
RAN radio access network
RF radio frequency
RHE RTP header extension
RLC radio link control
RRC radio resource control
RRH remote radio head
RS reference signal
RTCP real-time transport control protocol
RTP real-time transport protocol
RTSP real-time streaming protocol
RTT round trip time
RU radio unit
Rx receiver
SDAP service data adaptation protocol
SDP session description protocol
SGW serving gateway
SIP session initiation protocol
SMF session management function
SRTCP secure real-time transport control protocol
SRTP secure real-time transport protocol
TTL time to live
Tx transmitter
UDP user datagram protocol
UE user equipment (e.g., a wireless, typically mobile device)
UPF user plane function
URI uniform resource identifier
V3C visual volumetric video-based coding
VNR virtualized network function
VR virtual reality
WebRTC web real-time communication
XR extended reality (e.g. AR, MR, VR, etc.)

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with PAN node 170 via a wireless link 111.

The RAN node 170 in this example is a base station that provides access by wireless devices such as the UE 110 to the wireless network 100. The PAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the PAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The PAN node 170 may also be an eNB (evolved NodeB) base station, for LTE (long term evolution), or any other suitable base station, access point, access node, or node.

The PAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The PAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMFF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The PAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, PAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to media awareness in communication networks. In 3GPP SA4, a specification is being developed under the 5G_RTP WI (Work Item) within the 3GPP Rel. 18 timeframe. The SA2 group under 3GPP produced a Technical Report (TR) on the Study of XR (Extended Reality) and media services (3GPP TR 23.700-60 V2.0.0 (2022-11) 3rd Generation Partnership Project; Technical Specification Group Services and System Aspects; Study on XR (Extended Reality) and media services (Release 18)). There is work in 3GPP that attempts to make the network more media-aware. If the network has greater knowledge about the traffic that is traveling through, then it facilitates the network to apply strategies to optimize the delivery of the packets (e.g. ensure the most important parts of the stream always have a timely delivery). Adding media awareness involves benefits of improved quality of experience (QOE), but also carries risk of misuse. Thus, there is a need to facilitate media aware behavior in a network while ensuring fairness.

Adding information regarding the relative importance of a protocol data unit (PDU), a PDU set, or packets within a PDU at the real-time transport protocol (RTP) level has unique benefits. Some of the benefits may be as follows: the network may become more aware about the media or in general the payload carried; this may enable the network to take appropriate decisions for specific packets of PDU or PDU set(s); and/or the network may take action based on this method by merely inspecting the RTP header extension (HE) without requiring additional information about the application or the multimedia session. For example, RTP data may traverse a different route in the network compared to the session initiation and negotiation protocol flow. Furthermore, the network element(s) handling RTP flows cannot always be assumed to have information about the associated session description.

The network decisions may include dropping the packets (for example PDUs or PDU set related packets), delaying the packets (for example PDUs or PDU set related packets), etc. This implicitly may impact PDU sets that carry the PDU set handling RTP HE, as well as the PDU sets that do not carry such an RTP HE.

The Technical Report (3GPP TR 23.700-60 V2.0.0 (2022-11) 3rd Generation Partnership Project; Technical Specification Group Services and System Aspects; Study on XR (Extended Reality) and media services (Release 18)) studies key issues, solutions and conclusions on the support of advanced media services, e.g. High Data Rate Low Latency (HDRLL) services, AR/VR/XR services, and tactile/multi-modality communication services. The objectives may include one or more of the following:

Enhancements for supporting multi-modality service: Study whether and how to enable delivery of related tactile and multi-modal data (e.g. audio, video and haptic data related to a specific time) with an application to the user at a similar time, focusing on the need for policy control enhancements (e.g. quality of service (QoS) policy coordination).

Enhancements of network exposure to support interaction between 5G system (5GS) and application(s): Study whether and how interaction between application function (AF) and 5GS is needed for application synchronization and QoS policy coordination among multiple UEs, or between multiple QoS flows per UE. Study exposure of 5GS QoS information (e.g. QoS capabilities) and network conditions to the Application to enable quick codec/rate adaptation help to provide desired QoE (e.g. such as assist in alleviating 5GS congestion).

Study whether and how the following QoS and policy enhancements for XR service and media service transmission are performed: Study the traffic characteristics of media service enabling improved network resources usage and QoE. Enhance QoS framework to support PDU set granularity (e.g. video/audio frame/tile, Application Data Unit, control information), where a PDU set consists of PDUs that have the same QoS requirements.

Support differentiated QoS handling considering different importance of PDU sets (e.g. eligible drop packets belong to a less important PDU set to reduce resource waste).

Whether and how to support uplink-downlink transmission coordination to meet RTT (Round-Trip Time) latency requirements between UE and N6 termination point at the UPF.

Potential policy enhancements to minimize the jitter, focusing on, i.e., requirement provisioning from AF, extension of policy control and charging (PCC) rule.

Study potential enhancements of power management considering traffic pattern of media services: Power saving enhancement (e.g. support trade-off of throughput/latency/reliability considering device battery life, whether and how to enhance connected mode discontinuous reception (CDRX), considering XR/media traffic pattern).

In order to meet some of these objectives, the SA2 group sent a liaison letter to the SA4 group of the 3GPP (S4-221244, LS on N6 PDU set identification) with the following.

SA2 have further discussed the different examples of applications that can map onto the concept of PDU set indicated by SA4 in their LS S2-2203658/S4-220505, and several solutions have been proposed for identifying at the UPF the PDU sets generated by the access stratum. Among the proposed solutions, some can be summarized in these two options:

Option 1. Use available fields in the header described in existing IETF RFCs and drafts of the RTP protocol.

Option 2. Define new protocol (e.g., RTP/SRTP) header extensions by taking into account Network Abstraction Layer (NAL) units, RTP Payload type (e.g., H.264/5/6 and VP9/AV1), etc., to identify PDU sets in DL, including, for example, PDU set sequence number, PDU set size in bits, PDU set length in number of PDUs, and/or PDU sequence number within the PDU set.

The purpose of option 2 is to simplify the extraction of PDU set related information. SA2 believes that option 2 falls under SA4's responsibility, and asked them to investigate and, if necessary, define new mechanisms to identify PDU sets between the access stratum and the UPF, and also provide timeline information so that SA2 can decide whether Option 2 can be considered within SA2 Rel-18 normative work (e.g., within Q1/Q2 2023).

XR relates to a variety of immersive technologies, including but not limited to virtual reality (VR), augmented reality (AR), and mixed reality (MR). Virtual reality (VR) is an area of technology in which video content may be provided (e.g. streamed) to, for example, a VR display system. VR video content may be provided alongside other VR content, such as audio, haptic, etc. content. The VR display system may be provided with a live or stored feed from a video content source, the feed representing a VR space or world for immersive output through the display system. A virtual space or virtual world is any computer-generated version of a space, for example a captured real-world space, in which a user can be immersed through a display system such as a VR headset. A VR headset may be configured to provide VR video and audio content to the user, e.g. through the use of a pair of video screens and headphones incorporated within, or associated with, the headset. A VR headset may be configured to provide feedback, for example pose/haptic data, to a server for purposes of informing the provision of VR content. Augmented reality (AR) and mixed reality (MR) may be similar to VR in that video content may be provided, as above, which may be overlaid over or combined with aspects of a real-world environment in which the AR/MR content is being consumed. A user of AR content may therefore experience a version of the real-world environment that is "augmented" with additional virtual features, such as virtual visual and/or audio objects. A device may provide AR video and audio content overlaid over a visible, see-through, or recorded version of the real-world visual and audio elements.

The Session Description Protocol (SDP) is a format for describing multimedia communication sessions for the purpose of announcement and invitation. Its predominant use is in support of streaming media applications. SDP does not deliver any media streams itself, but is used between endpoints for negotiation of network metrics, media types, bandwidth requirements, and/or other associated properties. The set of properties and parameters is called a session profile. SDP is extensible for the support of new media types and formats. SDP is widely deployed in the industry, and is used for session initialization by various other protocols, such as session initiation protocol (SIP) or web real-time communication (WebRTC) related session negotiation.

The Session Description Protocol describes a session as a group of fields in a text-based format, one field per line. The form of each field is as follows:

<character>=<value><CR><LF>

Where <character> is a single case-sensitive character and <value> is structured text in a format that depends on the character. Values are typically UTF-8 encoded. Whitespace is not allowed immediately to either side of the equal sign.

Session descriptions consist of three sections: session, timing, and media descriptions. Each description may contain multiple timing and media descriptions. Names are only unique within the associated syntactic construct.

Fields must appear in the order shown; optional fields are marked with an asterisk:

v=(protocol version number, currently only 0)
o=(originator and session identifier: username, id, version number, network address)
s=(session name: mandatory with at least one UTF-8-encoded character)
i=* (session title or short information)
u=* (URI of description)
e=* (zero or more email address with optional name of contacts)
p=* (zero or more phone number with optional name of contacts)
c=* (connection information-not required if included in all media)
b=* (zero or more bandwidth information lines)
One or more time descriptions ("t=" and "r=" lines; see below)
z=* (time zone adjustments)
k=* (encryption key)
a=* (zero or more session attribute lines)
Zero or more Media descriptions (each one starting by an "m=" line; see below)
Time description (mandatory)
  t=(time the session is active)
  r=* (zero or more repeat times)

Media description (optional)
    m=(media name and transport address)
    i=* (media title or information field)
    c=* (connection information—optional if included at session level)
    b=* (zero or more bandwidth information lines)
    k=* (encryption key)
    a=* (zero or more media attribute lines—overriding the Session attribute lines)

Below is a sample session description from RFC 4566. This session is originated by the user "jdoe", at IPv4 address 10.47.16.5. Its name is "SDP Seminar" and extended session information ("A Seminar on the session description protocol") is included along with a link for additional information and an email address to contact the responsible party, Jane Doe. This session is specified to last for two hours using network time protocol (NTP) timestamps, with a connection address (which indicates the address clients must connect to or—when a multicast address is provided, as it is here—subscribe to) specified as IPv4 224.2.17.12 with a time to live (TTL) of 127. Recipients of this session description are instructed to only receive media. Two media descriptions are provided, both using the RTP Audio/Video Profile. The first is an audio stream on port 49170 using RTP/AVP (attribute value pair) payload type 0 (defined by RFC 3551 as pulse code modulation codec (PCMU)), and the second is a video stream on port 51372 using RTP/AVP payload type 99 (defined as "dynamic"). Finally, an attribute is included which maps RTP/AVP payload type 99 to format h263-1998 with a 90 kHz clock rate. RTCP ports for the audio and video streams of 49171 and 51373, respectively, are implied.

v=0
    o=jdoe 2890844526 2890842807 IN IP4 10.47.16.5
    s=SDP Seminar
    i=A Seminar on the session description protocol
    u=http://www.example.com/seminars/sdp.pdf
    e=j.doe@example.com (Jane Doe)
    c=IN IP4 224.2.17.12/127
    t=2873397496 2873404696
    a=recvonly
    m=audio 49170 RTP/AVP 0
    m=video 51372 RTP/AVP 99
    a=rtpmap:99 h263-1998/90000

SDP uses attributes to extend the core protocol. Attributes can appear within the Session or Media sections and are scoped accordingly as session-level or media-level. New attributes can be added to the standard through registration with IANA. A list of all registered attributes can be found at https://www.iana.org/assignments/sdp-parameters/sdp-parameters.xhtml #sdp-att-field. A media description may contain any number of "a=" lines (attribute-fields) that are media description specific. Session-level attributes convey additional information that applies to the session as a whole, rather than to individual media descriptions.

Attributes are either properties or values:
    a=<attribute-name>
    a=<attribute-name>:<attribute-value>

Examples of attributes defined in RFC8866 are "rtpmap" and "fmpt". The "rtpmap" attribute maps from an RTP payload type number (as used in an "m=" line) to an encoding name denoting the payload format to be used. It also provides information on the clock rate and encoding parameters. Up to one "a=rtpmap:" attribute can be defined for each media format specified. Thus, we might have the following:

m=audio 49230 RTP/AVP 96 97 98
    a=rtpmap:96 L8/8000
    a=rtpmap:97 L16/8000
    a=rtpmap:98 L16/11025/2

In the example above, the media types "audio/L8" and "audio/L16" are audio data sample formats.

Parameters added to an "a=rtpmap:" attribute should only be those required for a session directory to make the choice of appropriate media to participate in a session. Codec-specific parameters should be added in other attributes, for example, "fmtp". The "fmtp" attribute allows parameters that are specific to a particular format to be conveyed in a way that SDP does not have to understand them. The format must be one of the formats specified for the media. Format-specific parameters, semicolon separated, may be any set of parameters required to be conveyed by SDP and given unchanged to the media tool that will use this format. At most one instance of this attribute is allowed for each format. An example is:

a=fmtp:96 profile-level-id=42e016;max-mbps=108000; max-fs=3600

For example, RFC7798 defines the following: sprop-vps, sprop-sps, sprop-pps, profile-space, profile-id, tier-flag, level-id, interop-constraints, profile-compatibility-indicator, sprop-sub-layer-id, recv-sub-layer-id, max-recv-level-id, tx-mode, max-lsr, max-lps, max-cpb, max-dpb, max-br, max-tr, max-tc, max-fps, sprop-max-don-diff, sprop-depack-buf-nalus, sprop-depack-buf-bytes, depack-buf-cap, sprop-segmentation-id, sprop-spatial-segmentation-idc, dec-parallel-cap, and include-dph.

Considering that visual volumetric video-based coding (V3C) compresses volumetric content using video codecs, traditional video coding systems can be leveraged. As such, video components containing occupancy, geometry, or attribute information may be encapsulated into RTP video stream(s). There is also ongoing work to define an RTP payload format for atlas data, which would enable streaming of volumetric content over multiple RTP streams.

RTP is intended for an end-to-end, real-time transfer of streaming media and provides facilities for jitter compensation, and detection of packet loss and out-of-order delivery. RTP allows data transfer to multiple destinations through IP multicast or to a specific destination through IP unicast. The majority of the RTP implementations are built on top of the User Datagram Protocol (UDP). Other transport protocols may also be utilized. RTP is used together with other protocols such as H.323 and Real Time Streaming Protocol (RTSP).

The RTP specification describes two protocols: RTP and real-time transport control protocol (RTCP). RTP is used for the transfer of multimedia data, and its companion protocol (RTCP) is used to periodically send control information and QoS parameters.

RTP sessions are typically initiated between client and server, or between client and another client (or a multi-party topology) using a signaling protocol, such as H.323, the Session Initiation Protocol (SIP), or RTSP. These protocols typically use the Session Description Protocol (RFC 8866) to specify the parameters for the sessions.

An RTP session is established for each multimedia stream. Audio and video streams may use separate RTP sessions, enabling a receiver to selectively receive components of a particular stream. The RTP specification recommends even port numbers for RTP, and the use of the next odd port number for the associated RTCP session. A single port can be used for RTP and RTCP in applications that multiplex the protocols.

Each RTP stream consists of RTP packets, which in turn consist of RTP header and payload pairs. Referring now to FIG. 2A, illustrated is an example of the RTP header having RFC 3550 format. The first twelve octets are present in every RTP packet, while the list of CSRC identifiers is present only when inserted by a mixer. The fields have the following meanings. version (V): 2 bits. This field identifies the version of RTP. The version defined by this specification is two (2). (The value 1 is used by the first draft version of RTP, and the value 0 is used by the protocol initially implemented in the "vat" audio tool). padding (P): 1 bit. If the padding bit is set, the packet contains one or more additional padding octets at the end which are not part of the payload. The last octet of the padding contains a count of how many padding octets should be ignored, including itself. Padding may be needed by some encryption algorithms with fixed block sizes or for carrying several RTP packets in a lower-layer protocol data unit. extension (X): 1 bit. If the extension bit is set, the fixed header must be followed by exactly one header extension. CSRC count (CC): 4 bits. The CSRC count contains the number of CSRC identifiers that follow the fixed header. marker (M): 1 bit. The interpretation of the marker is defined by a profile. It is intended to allow significant events such as frame boundaries to be marked in the packet stream. A profile may define additional marker bits or specify that there is no marker bit by changing the number of bits in the payload type field (see Section 5.3). payload type (PT): 7 bits. This field identifies the format of the RTP payload and determines its interpretation by the application. A profile may specify a default static mapping of payload type codes to payload formats. Additional payload type codes may be defined dynamically through non-RTP means (see Section 3). A set of default mappings for audio and video is specified in the companion RFC 3551. An RTP source may change the payload type during a session, but this field should not be used for multiplexing separate media streams (see Section 5.2). A receiver must ignore packets with payload types that it does not understand. sequence number: 16 bits. The sequence number increments by one for each RTP data packet sent, and may be used by the receiver to detect packet loss and to restore packet sequence. The initial value of the sequence number should be random (unpredictable) to make known-plaintext attacks on encryption more difficult, even if the source itself does not encrypt according to the method in Section 9.1, because the packets may flow through a translator that does. Techniques for choosing unpredictable numbers are discussed in RFC 1750. timestamp: 32 bits. The timestamp reflects the sampling instant of the first octet in the RTP data packet. The sampling instant must be derived from a clock that increments monotonically and linearly in time to allow synchronization and jitter calculations (see Section 6.4.1). The resolution of the clock must be sufficient for the desired synchronization accuracy and for measuring packet arrival jitter (one tick per video frame is typically not sufficient). The clock frequency is dependent on the format of data carried as payload and is specified statically in the profile or payload format specification that defines the format, or may be specified dynamically for payload formats defined through non-RTP means. If RTP packets are generated periodically, the nominal sampling instant as determined from the sampling clock is to be used, not a reading of the system clock. As an example, for fixed-rate audio the timestamp clock would likely increment by one for each sampling period. If an audio application reads blocks covering 160 sampling periods from the input device, the timestamp would be increased by 160 for each such block, regardless of whether the block is transmitted in a packet or dropped as silent.

Referring now to FIG. 2B, illustrated is an example of the RTP header extension having RFC 3550 and RFC 8285 format. If the X bit in the RTP header is one, a variable-length header extension must be appended to the RTP header, following the CSRC list if present. The header extension contains a 16-bit length field that counts the number of 32-bit words in the extension, excluding the four-octet extension header (therefore zero is a valid length). Multiple RTP header extensions can be appended to the RTP data header in accordance with RFC8285. To allow multiple interoperating implementations to each experiment independently with different header extensions, or to allow a particular implementation to experiment with more than one type of header extension, the first 16 bits of the header extension are left open for distinguishing identifiers or parameters. The format of these 16 bits is to be defined by the profile specification under which the implementations are operating. This RTP specification does not define any header extensions itself.

Referring now to FIG. 2C, illustrated is an example of a one-byte RTP header extension. Referring now to FIG. 2D, illustrated is an example of a two-byte RTP header extension.

RFC 4585 defines an extension to AVP that allow receivers to provide more immediate RTCP feedback to the senders and thus allows for short-term adaptation and efficient feedback-based repair mechanisms to be implemented. The RFC defines an immediate feedback mode: A mode of operation in which each receiver of a media stream is, statistically, capable of reporting each event of interest immediately back to the media stream sender. It also defines early RTCP mode: The mode of operation in that a receiver of a media stream is often (but not always) capable of reporting events of interest back to the sender close to their occurrence. The common packet format for RTCP FB messages is illustrated in FIG. 2E.

Based on the LS on N6 PDU set identification from SA2 group, the following options are possible:

Option 1. Use available fields in the header described in existing IETF RFCs and drafts of the RTP protocol.

Option 2. Define new protocol (e.g., RTP/SRTP) header extensions by taking into account Network Abstraction Layer (NAL) units, RTP Payload type (e.g., H.264/5/6 and VP9/AV1), etc., to identify PDU sets in DL, including, e.g., PDU set sequence number, PDU set size in bits, PDU set length in number of PDUs, PDU sequence number within the PDU set, etc.

In the TR 23.700-60 Study on XR (Extended Reality) and media services, several solutions for handling PDU set integrated handling and PDU set differentiated handling are outlined. Some of the text from clause 6.12 and 6.14 is given below.

For interactive media services (e.g. Cloud XR, cloud gaming, real-time video based remote control), each frame/video slice is delivered via multiple PDUs in the 5GS. For example, an I-Frame of 4K video can be more than 1 MB, which means around 1000 IP packets are needed to deliver it. Considering the frame/video slice can only be decoded in case all packets (or most of the packets, if forward error correction (FEC) is used during encoding) are successfully received. The 5G system should be aware of the PDU set, and handle packets of one PDU set in an integrated manner. When one or some PDUs fail to be transmitted, the whole PDU set can be dropped.

In a solution, the following aspects may be included. Optionally, AF provides PCF with the PDU set level QoS requirements and the Flow description for the target media service data flow. PCF may generate the PCC rule with PDU set level QoS parameters and also the detection rules for the PDU set. PCF sends the PCC rule to SMF. The SMF distributes these QoS parameters/policy to RAN/UPF and instructs the UPF to detect PDU set during the PDU Session Establishment/Modification procedures. Once the application service started, the UPF identify the PDUs of each PDU set and marks PDU set information in the GTU-U header of DL packets to PAN. The details of how to identify the PDUs within a PDU set is in clause 6.12.3.2. PAN identifies the PDUs of a PDU set based on the PDU set information in the GPRS tunnelling protocol—user data (GTP-U) headers. PAN performs the PDU set integrated packet processing to deliver the PDU set to UE.

Figure 3:
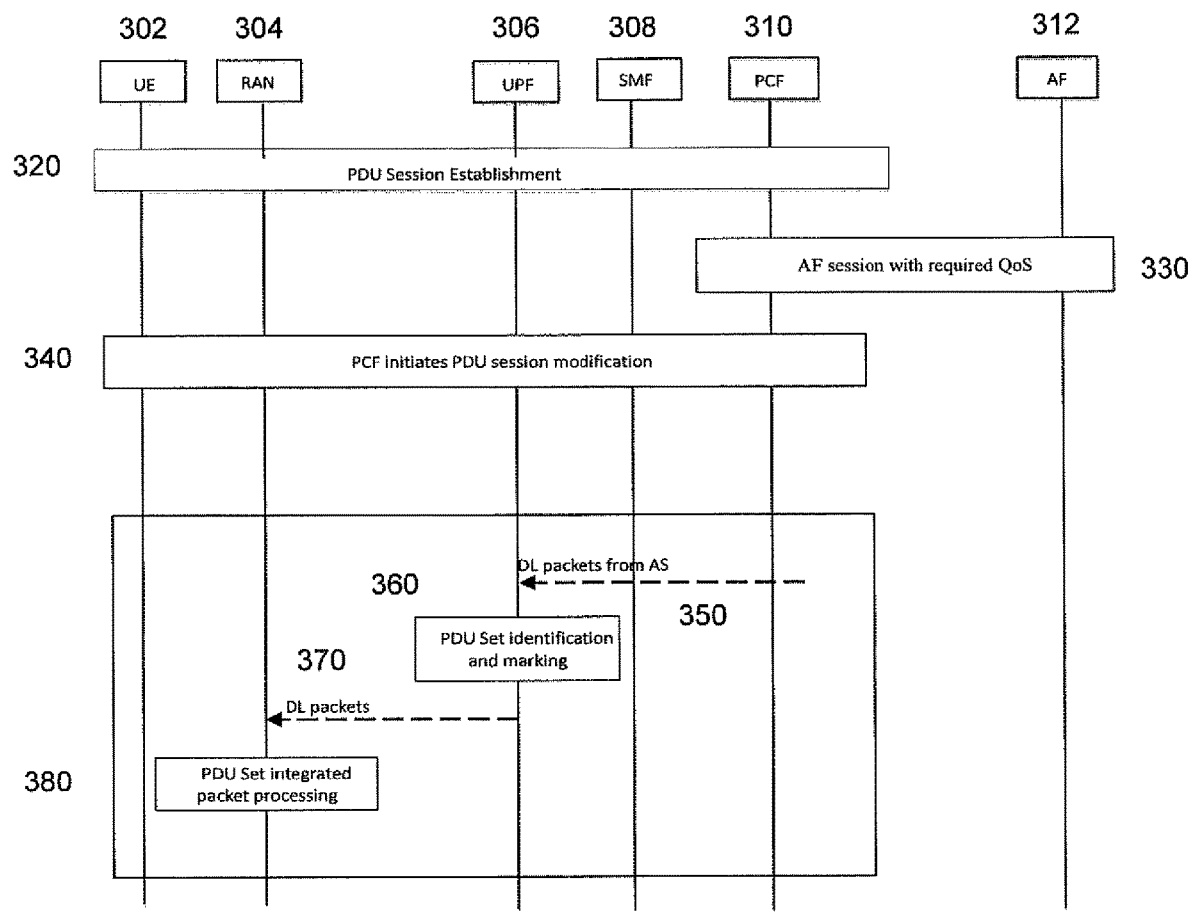
FIG. 3 is a diagram illustrating features as described herein.

Referring now to FIG. 3, illustrated is a high-level procedure of PDU set integrated packet handling, including a modification process of the PDU session for the XR service. At 320, the UE (302) establishes a PDU Session as defined in clause 4.3.2.2.1 of TS 23.502, for example with PAN (304), UPF (306), SMF (308), and PCF (310). A network slice type for XR service can be used for such a PDU Session. At 330, optionally, as defined in clause 4.15.6.6 of TS 23.502, the AF (312) may invoke the Nnef_AFsessionWithQoS_Create request to set up an AF session with required QoS. The AF (312) may send the following information to PCF (310): flow description of the target media service data flows for PDU set handling; burst periodicity; and/or the PDU set level packet handling/treatment requirements. The PDU set level packet handling/treatment requirements are optional and may include, for example, PDU set error rate, PDU set delay budget, maximum PDU set loss rate/number, media protocol information (e.g. which RFC is used in user data), etc. At 340, PCF (310) may initiate the PDU session modification procedure as defined in clause 4.3.3.2 of TS 23.502. The PCF (310) generates appropriate PCC rules based on the information from AF (312), as mentioned at 330 (e.g. 5G quality of service identifier (5QI), PER and/or packet delay budget (PDB)). The PDU set level packet handling/treatment requirements may be considered during the PCC rule generation. The PCC rules may also include the detection rules of service data flow, PDU set level packet handling/treatment policy, and/or PDU set identification rules. The PDU set identification rules may contain RTP header identification method, and/or RTP payload identification method for H.264, H.265 and H.266. The PCF (310) sends the PCC rules to SMF (308). The SMF (308) generates the QoS profiles and N4 rules based on the PCC rules from PCF, which may include the packet handling/treatment policy. The SMF (308) sends the N4 rules to the UPF (306) via the N4 rule, which may include the identification and marking rule for PDU set. Besides, SMF (308) also sends the QoS profiles to the RAN node (304) via AMF, and instructs RAN to perform PDU set integrated QoS handling. It may be noted that, based on media protocol information included in the PDU set level packet handling/treatment requirements or based on pre-configuration, the SMF (308) generates N4 rules accordingly to instruct UPF (306) to identify the PDU sets of corresponding protocols. At 350, the UPF (306) may receive DL packets from the AS. At 360, based on received N4 rules or local configuration on the UPF (306), the UPF (306) identifies the PDU set and marks PDU set information in the GTP-U layer in the DL packets, including start/end indication of the PDU set and the PDU set ID. At 370, the UPF (306) may transmit DL packets to the RAN (304). At 380, the PAN (304) identifies the PDU set based on the PDU set information in GTP-U header and transmits PDUs within the PDU set in an integrated manner (e.g. the RAN (304) may drop the PDU set as a whole in case of poor network condition, and execute packet handling/treatment policy).

PDU set identification and marking on UPF may be performed. The UPF may identify the PDUs of one PDU set via different ways (e.g. the RTP headers/payloads in case RTP is used, the traffic periodicity, etc.). The UPF may then add marks/information in the GTP-U headers of DL packets to assist RAN for the PDU set identification (e.g. the start/end indication of the PDU set and PDU set ID). The identification of PDU set depends on what the PDU set represents (e.g. a video frame or a video slice).

Figure 4:
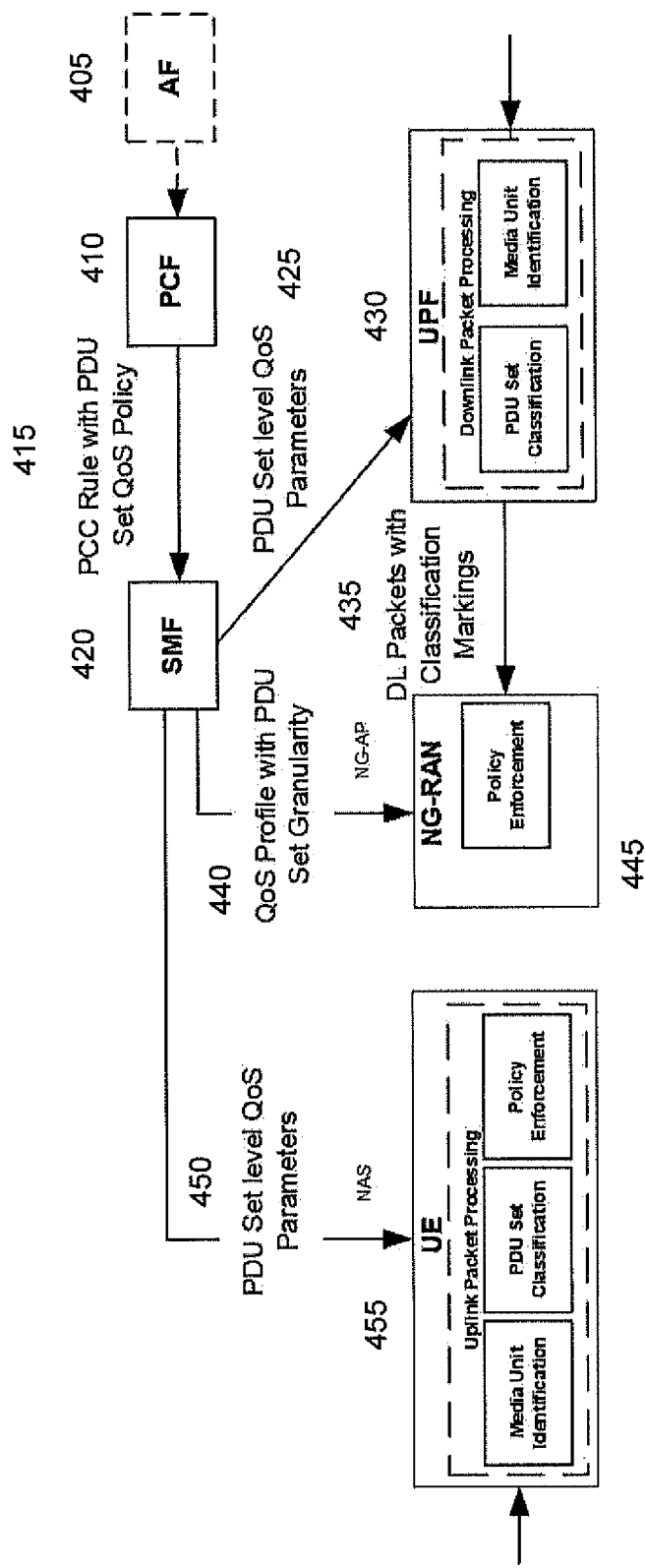
FIG. 4 is a diagram illustrating features as described herein.

Referring now to FIG. 4, illustrated is an example of 5GS support for PDU family integrated packet handling. The decomposition and mapping of functionality shown in FIG. 4 may support PDU set integrated packet handling. The following may be assumed.

Media Unit Identification. Media unit identification detects media specific properties of packets according to the PDU families to which it belongs. Media unit identification may utilize techniques such as dots per inch (DPI) and/or examination of RTP headers to determine the media units associated with a packet. Media unit identification may be performed at the UE (455) (for uplink) or the UPF (430) (for downlink). Media unit identification may be implemented differently in the UE (455) and UPF (430). At the UE (455) it may be integrated with functionality described by SA4 in TR 29.998 (e.g. for 5G STAR UE or EDGAR UE). Information needed to detect the media units may be configured on the SMF/UPF (420/430), or in the case of RTP headers, the AF (405) may provide information regarding the RTP header to be detected. If RTP is not used, media unit detection may not be possible for encrypted traffic.

Packet Classification. Packet classification uses media unit identification information to associate packets with a PDU set in one or more PDU families. Classification captures media layer attributes that can impact QoS treatment. This may include dependence of packet treatment on the successful handling of other packets (e.g. treatment of a packet carrying a P-Frame fragment is dependent on the successful handling of packets carrying I-Frame fragments) or treatment of a packet carrying an enhancement layer may be dependent on the successful handling of packets carrying a base layer. Classification (435) may be conveyed from the UPF (430) to the NG-RAN (445) via markings/information added to a GTP-U header extension, and hence 3GPP standardization of classification is required.

In addition, optionally, assistance information describing media and traffic characteristics may not be required per-packet, such as RTP header type (for media where an RTP header is used), number of temporal and spatial media layers, Group of Pictures (GOP) structure, temporal and spatial layer periodicities and inter-dependencies, etc.; instead, it may be provided by an AF (405) or configured in the 5GS.

Enhanced QoS Policy—In the 5GS, how packets are treated is based on QoS policy (415) determined at the PCF (410). While packet classification markings/information indicate PDU set associations and media unit properties (for example, indicating that the packet carries a fragment of an I-Frame from a spatial enhancement layer that is dependent on a base layer for an H.26x video stream), they do not specify how the packet is treated in the 5GS. To align with the current 5GS QoS framework, QoS policy may be enhanced to provide PDU set granularity QoS information (425, 440, 450) indicating how packets should be treated. The enhanced policy information may be sent to the SMF (420) in a PCC rule (440, 450) and sent to the NG-RAN (445) and UE (455) using existing mechanisms.

Enhanced policy sent from the SMF (420) to the NG-RAN (445) (via the QoS Profile (440)) and/or UE (455) may comprise one or more of the following:

Changes to the QoS flow priority level according to the classification of a PDU as belonging to a PDU set in one or more PDU families (see example in TABLE 1 below).

Changes to QoS flow PER according to the classification of a PDU as belonging to a PDU set in one or more PDU families.

Changes to QoS flow PDB according to the classification of a PDU as belonging to a PDU set in one or more PDU families.

PDU set validity time, which indicates, for each PDU set type, the maximum delay for a given PDU set instance to be delivered to the recipient. Beyond the validity time, the PDU set instance is not considered valid, and thus all packets of the PDU set that were not transmitted can be discarded at the RAN (445). The PDU set validity time defines an upper bound time limit that the combined set of packets in a PDU set instance may be delayed between the UE (450) and the N6 termination point at the UPF (430).

Note, for example, that for an I-Frame PDU set, the validity time may take into account the usefulness of I-Frames for subsequent P-Frame decoding, which may occur at a later time than is required to render the I-Frame. Similar scenarios apply for PDU sets in the temporal and spatial layer PDU families where an enhancement layer PDU set may be dependent on a base layer PDU set. When there is one packet in the PDU set, the validity time may be greater than the PDB to reflect the usefulness of the PDU set for this purpose.

Neither the PAN (445) nor UE (455) are aware of media layer details. PAN behavior (445) to enforce policy is up to PAN WGs. The details of UE (455) behavior is up to UE implementation.

Policy enforcement PDU set level packet treatment in the NG-RAN (445) and UE (455) is achieved by matching all PDU set packet classification markings with the enhanced QoS policy information provided in the QoS profile and PDU set level QoS parameters (440, 450).

PDU families and packet classification may be described as "group of packets (that) belongs to a same PDU Set will be handled in an integrated manner". In media streams, groups of packets handled in an integrated manner occur at different levels. These levels include: Level 1 PDU Family; Level 2 to Level N PDU Family; and Level N+1 PDU Family.

Level 1 PDU Family—Media Frame or Media Frame Slice: Packets that comprise fragments of a media frame (e.g. an I-Frame/Slice or a P-Frame/Slice where a slice is an independently encoded region of a frame and is also the minimum media unit of transmission over the network) may be handled in an integrated manner since, for example only by sending all packets of a frame or a frame slice can the frame/slice be successfully decoded. Hence the set of PDUs that comprise a specific media frame or media frame slice should be considered a PDU set in the media frame or media frame slice PDU family. Differentiated QoS handling may be provided for PDUs that are members of different PDU sets in these families (e.g. a packet that is a member of I-Frame PDU set is given priority over a packet that is a member of a P-Frame PDU set).

Level 2 to Level N PDU Family—Additional Media Frame Sets: Groups of packets can comprise higher level media units that are processed in an integrated manner (as a PDU set), particularly for scalable/layered media. For example, packets that comprise a temporal base layer may be processed in an integrated manner and hence be members of a temporal base layer PDU set in the temporal layer family, while different packets that comprise a temporal enhancement layer-1 may be considered as members of a temporal enhancement Layer-1 PDU set in the same PDU family. Similarly, packets that comprise a spatial base layer may be processed in an integrated manner and hence be members of a spatial base layer PDU set in the spatial layer family, while different packets that comprise a spatial enhancement layer-1 may be considered as members of a spatial enhancement Layer-1 PDU set in that same PDU family. In addition to having different layers, a video frame may further be divided into tiles that represent different regions of the overall wide (e.g. full 360 degree) view, where tiles belonging to or close to the current user viewport may be sent with a different quality than the other tiles. Additional PDU families may be considered for this type of media.

Level N+1 PDU Family-Application Type/Media Stream/Sub-Flow—5GS QoS flows can carry multiple application flow instances of the same type (e.g. two H.26x video streams) as well as application flow instances of different types (e.g. H.26x video and AAC audio). To distinguish between these application flows within a QoS flow, packets associated with an application instance may comprise a PDU set in the application type/media stream/sub-flow PDU family. Differentiated QoS handling may be provided to PDUs according to the application type/media stream/sub-flow PDU set to which they belong (e.g. audio has higher priority than video). Alternatively, application flow instances may be mapped to separate QoS flows, in which case application type QoS differentiation can be provided by existing QoS.

A PDU may be classified as belonging to a PDU set in just one PDU family (e.g. an I-Frame PDU set in a media frame/slice family), or as belonging to a PDU set in each of several PDU families (particularly for scalable/layered media).

A GTP-U extension header field is defined for each PDU family. Note that, since an individual PDU may be a member of multiple PDU families, a field for each may be included in the extension header. Proposed PDU families may include: Frame/Slice; Temporal Layer; Spatial Layer; Application/Media Stream/Sub-Flow.

For each PDU family/GTP-U field, sub-fields contain the following information: the PDU set type; a rolling counter to sequentially number each PDU set instance within a PDU family (one counter for all PDU sets within the PDU family); dependency, which is the rolling-counter value previously assigned to the PDU set instance on which the PDU set is dependent.

In addition, a sub-field with a PDU set start/end indicator is provided for the frame/slice PDU family so the RAN can take advantage of time between frames for power saving.

The rolling counter distinguishes between PDUs belonging to two instances of the same PDU set type (e.g. two sequential P-Frames) and is used to indicate dependency of a PDU set instance on another PDU set instance (e.g. a P-Frame's dependency on a specific I-Frame instance, or an enhancement layer's dependency on a specific base layer instance).

For example, for packets classified in PDU Family #1 (media frame/slice), all packets carrying fragments of a particular I-Frame instance may be assigned a rolling counter value=3. Packets carrying P-Frames that are dependent on that I-Frame instance would have "3" indicated in their "Dependency" field. In another example, for packets classified in PDU Family #2 (Temporal Layer), all packets carrying fragments of a particular temporal base layer instance may be assigned a rolling counter value=7. Packets carrying temporal enhancement layers that are dependent on that base layer instance would have "7" indicated in their "Dependency" field.

Packets can belong to a PDU set in one or more of the PDU families as described above. The PDU set types represented at each level are defined via configuration. For example, for H.26x video one may have levels PDU families and PDU set types defined as:

Level 1: PDU Family #1=Media Frame/Slice, with Media Types.
  Not Assigned
  Independent or Random-access Frame or Slice ("I-Frame")
  Referenced Frame or Slice ("P-Frame" with forward references)
  Non-referenced Frame or Slice ("P-Frame" with no forward references)
Level 2: PDU Family #2=Temporal Media Layers, with PDU Set Types
  Not Assigned
  Base Layer
  Enhancement Layer 1
  Enhancement Layer 2
Level 3: PDU Family #4=Spatial Media Layers, with PDU Set Types
  Not Assigned
  Base Layer
  Enhancement Layer 1
  Enhancement Layer 2
Level 4: PDU Family #4=Application/Media Stream/Sub-Flow, with PDU Set Types
  Not Assigned
  H.26x video
  AAC Audio Values for the "PDU Set Type" portion of the GTP-U extension header for each PDU family fields and an example packet marking is shown in TABLE 1 below, which describes an example PDU set type GTP-U EH with PDU family classification marking for a packet. A packet from an H.264 video flow identified as carrying an I-Frame fragment in temporal enhancement layer 2 and a spatial base layer would be marked in the "PDU Set Type" GTP-U sub-header fields defined for the levels as shown in the 4th column of TABLE 1:

TABLE 1

| PDU Set Type | Field Name | PDU SetTypes (values and definition) | Example Packet Marking (PDU Set Type) | Interpretation of Example PDU Set Type |
|---|---|---|---|---|
| 1 | PDU Family #1 | 0 = Not Assigned<br>1 = Random-access (I) frame<br>2 = Referenced (P) frame<br>3 = Non-referenced (P) frame | 1 | Random-access (I) Frame |
| 2 | PDU Family #2 | Temporal Layers:<br>0 = Not Assigned<br>1 = Base Layer<br>2 = Enhancement Layer 1<br>3 = Enhancement Layer 2 | 3 | Temporal Enhancement Layer #2 |
| 3 | PDU Family #3 | Spatial Layers:<br>0 = Not Assigned<br>1 - Base Layer<br>2 - Enhancement Layer 1<br>3 - Enhancement Layer 2 | 1 | Spatial Base Layer |
| 4 | PDU Family #4 | Application/Media Stream/Sub-Flow:<br>0 = Not Assigned<br>1 = H.264 video<br>2 = AAC Audio | 1 | H.264 Video |

Figure 5:
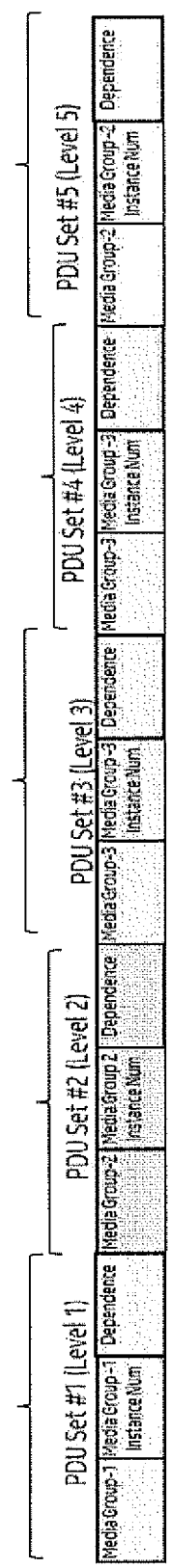
FIG. 5 is a diagram illustrating features as described herein.

This structure provides flexibility for cases where media unit identification is available for only a sub-set of PDU families. For example, if media detection can only distinguish packets associated an I-Frame and a P-Frame, or alternatively as associated with a base layer and an enhancement layer, the UPF may classify and mark those packets accordingly and leave the other fields "not assigned". Policy that differentiates packet handling, for example of packets associated with a "base layer" versus "enhancement layer", may then be applied, even if for example the frame-type/slice remains unidentified. The resultant, complete classification header markings for each packet may be as shown in FIG. 5, which illustrates a GTP-U packet header. Example entries are shown in parentheses in each sub-field in FIG. 5. The markings are for a PDU carrying an I-Frame for Temporal Enhancement Layer #1 and Spatial Enhancement Layer #1 of an H.264 video stream. Here, both enhancement layers are dependent on base layer instances, as indicated by the Level 2 and Level 3 dependency fields.

Packets are classified according to the PDU sets in PDU families to which they belong so that differentiated QoS that considers PDU family and PDU set classification can be applied, according to policy provisioned on the SMF or conveyed from the PCF. As per clause 5.7.3 of TS 23.501, currently priority level indicates a priority in scheduling resources among QoS Flows. PER and PDB are also assigned per QoS Flow. It may be assumed that each QoS flow is still assigned a pre-configured or standardized priority level, PER, and PDB, as in standardized 5QI characteristics table (see clause 5.7.4 of TS 23.501), or a priority level, PER, or PDB for the QoS flow is signaled over the next generation application protocol (NGAP). This is the reference priority level, PER, and PDB for all the packets within the QoS flow.

To vary priority level, PER, and PDB according to how a packet is classified, a per-packet adjustment to the reference priority level may be determined according to new Parameteradjustment information provided in QoS information that is pre-configured, associated with a standardized 5QI, or sent from the PCF to the NG-RAN, and/or UE. The Parameteradjustment information contains per PDU family/PDU set type adjustments to the reference ParameterLevels. For each PDU family and PDU set type to which a packet belongs, the ParameterAdjustment information provides a value that is added to the reference parameter. The resultant sum for all adjustments to the reference priority determines the priority of the packet.

To illustrate using the priority level QoS parameter, as per Table 5.7.4-1 of TS 23.50, a standardized 5QI=89 (e.g. visual content for cloud/edge/split rendering) with a default (i.e. reference) Priority=25 could be selected to transport H.26x video. The priority level adjustment information provided to the NG-RAN corresponding to the packet classification illustrated in TABLE 1 above could be as shown in TABLE 2 below (note a reduced priority level means higher priority).

Packets received at the NG-PAN with GTP-U markings as described above in clause 6.14.2.1 would have their reference parametersadjusted according to the PDU family and PDU set type to which they are associated. For instance, if the reference priority level is 25, packets classified as belonging to PDU Set Type #1 (I-Frame) in PDU Family #1 (Media Frame/Slice) would have their priority level decreased by "2".

TABLE 2 illustrates priority level adjustment for H.26x video for PDU sets shown in TABLE 1 above:

TABLE 2

|  | PDU Family #1 (Frame Type) | PDU Family #2 (Media Layer 1) | PDU Family #3 (Media Layer 2) | PDU Family #4 (Application Type) |
| --- | --- | --- | --- | --- |
| PDU Set Type #0 (not assigned) | 0 | 0 | 0 | 0 |
| PDU Set Type #1 | −2 | −2 | −1 | +1 |
| PDU Set Type #2 | +2 | 0 | +1 | −1 |
| PDU Set Type #3 |  | +1 | +2 |  |
| PDU Set Type #4 |  |  |  |  |

To further illustrate, the QoS flow reference priority level=25 would be decreased by 2 if the packet carries an I-Frame (PDU Family #1, Media Type #1), increased by 1 if the packet carries a temporal enhancement layer 2 (PDU Family #2, Type #3), decreased by 1 if it is in the base spatial layer (PDU Family #4, Type #1), and increased by 1 because it is an H.264 video application (PDU Family #5, Type #1) so the resultant priority for the example packet is 24.

Similar tables may provide adjustments to the reference level for PER and PDB. These tables would be provided to the NG-RAN and/or UE, for example to the NG-RAN in an expanded QoS profile, so that the PAN and/or UE can treat packets with corresponding classification markings/information with the appropriate priority.

In addition, for each PDU set type in each PDU family, a PDU set validity time as described above may be provided. The PDU set validity time may be used by the NG-RAN to decide whether to transmit or drop the PDUs of a PDU set instance.

Additional QoS differentiation may be provided with additional policy information similar to Table 2 for other QoS parameters. For example, ARP may be varied depending on whether a packet belongs to a base layer vs an enhancement layer.

Tdoc S4-221253 includes a discussion on the usage of RTP/SRTP header and header extension for PDU set/frame identification. The solution(s) presented in the document can be categorized into two groups of using: (i) IETF RTP [RFC 3550, RTP: A Transport Protocol for Real-Time Applications]/SRTP [RFC 6904, Encryption of Header Extensions in the Secure Real-time Transport Protocol (SRTP)] header; (ii) IETF framemarking [draft-ietf-avtext-framemarking-13, Frame Marking RTP Header Extension, Latest revision 2021-11-11] (using RTP header extension [RFC 8285, RTP Generic Header Extension] mechanism). The above-mentioned solution (i) is mainly targeted for video codecs including H264/H265/H266/VP8/VP9 using IETF payload format specification. Solution (ii) is merely useful for H.264/H.265 or VP8/9, with the assumption that IETF framemarking working group draft [draft-ietf-avtext-framemarking-13, Frame Marking RTP Header Extension, Latest revision 2021-11-11] will be published in due time.

The key insight of using solutions (i), (ii) for PDU boundary identification is that, when a non-encrypted RTP protocol is being used, it is not SRTP. With non-encrypted RTP, the assumption is the following:

" . . . UPF can identify the PDUs of one PDU Set via different ways, e.g. the RTP headers/payloads in case RTP is used, the traffic periodicity. The UPF then add marks in the GTP-U headers of DL packets to assist PAN for the PDU Set identification, e.g. the start/end indication of the PDU Set and PDU Set ID. The identification of PDU Set depends on what the PDU Set represents, e.g. a video frame or a video slice . . . "

PDU set identification and marking on UPF may be set up. For video frame identification, solution #12 of 23700-60 proposed using:

" . . . 1) the marking bit of RTP header for the very last packet of the frame indicated by the RTP timestamp 2) draft-ietf-avtext-framemarking, the extended RTP header format is shown as below. The "S" bit and "E" bit in the Frame Marking RTP header extension respectively represent the start and the end of a video frame. UPF can identify the start and end of a PDU Set/frame according to the "S" and "E" bits 3) the UPF can also use the periodicity information as frame traffic pattern to identify the PDU Set/frame. The traffic pattern may also be detected by UPF . . . "

Figure 6A:
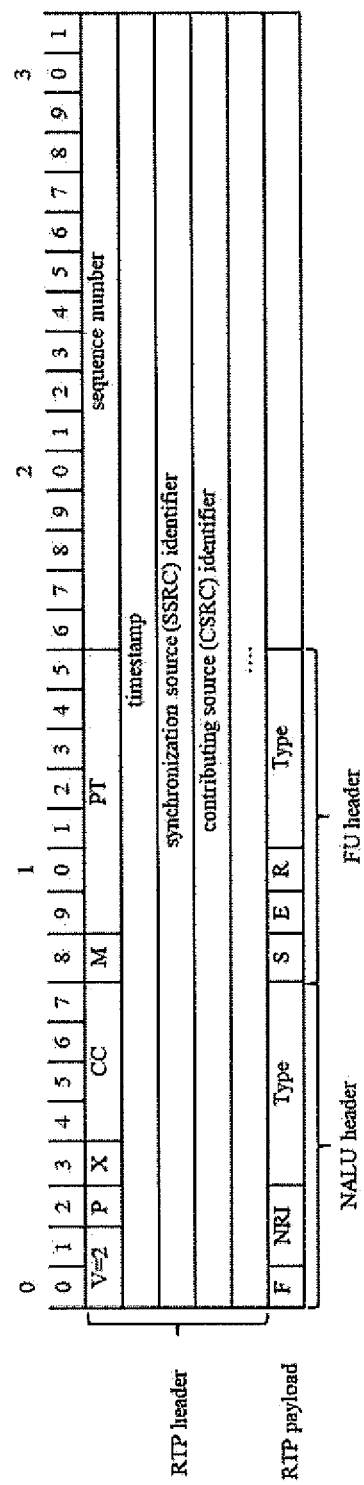
FIG. 6A is a diagram illustrating features as described herein.

FIG. 6A illustrates an example RTP header extension format.

For Video Slice identification for H264, solution #12 of 23700-60 proposed using:

" . . . 1) According to RFC 6184, within the RTP packet, the payload starts from a one-byte header structured for a Network Abstraction Layer (NAL) Unit encapsulating the slice output of encoded stream and the following is the encoded video content for one, part of or multiple video slices. The 5-bit NAL unit type in the NAL unit header can indicate the content of NAL unit, e.g. coded slice of an I frame, coded slice of a P frame. Besides, it can also indicate the possible structures of the RTP payload, e.g. single NAL unit packet, aggregation packet and fragmentation unit (FU). The NAL unit type for different RTP packet structure is shown below . . . "

Figure 6B:
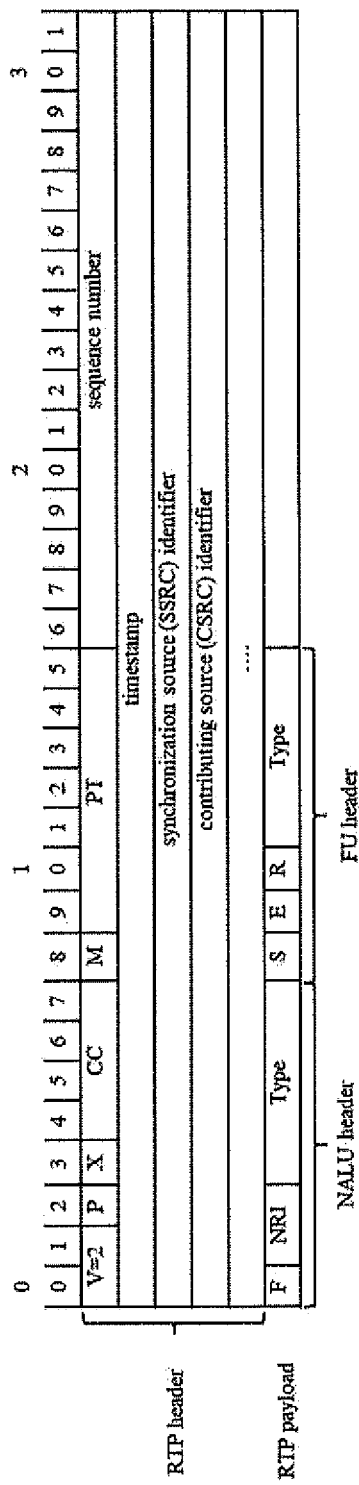
FIG. 6B is a diagram illustrating features as described herein.

FIG. 6B illustrates an example NAL unit header format for H.264. A similar approach is also being proposed for H265/H266 in 23700-60.

PDU set importance/dependency information identification on UPF may be set up. Solution #24 of 23700-60 takes a slightly different approach by setting importance/dependency information of PDU set as a video frame and slice:

"... To support differentiated QoS handling for PDU Sets in 5GS, the UPF should firstly identify the PDU Sets (corresponding to a frame or video slice), then identify the importance/dependency of different PDU Set"

Video frame identification may be based on framemarking. In order to identify an "important" PDU set/frame for non-scalable streams, 6.24.3.2.1 of 23700-60 proposed the following:

" ... In the above RTP header extension (see clause 3.1 of draft-ietf-avtext-framemarking):

The I field named as Independent Frame reflects whether a frame can be decoded independent of temporally prior frames or not. 1 means this frame can be decoded independent of temporally prior frames, e.g. intra-frame, IDR frame of H.264/H.265 or VP8/9 keyframe.

The D field named as Discardable Frame which reflects whether a frame is droppable or not. 1 means the sender knows this frame can be discarded, and still provide a decodable media stream.

UPF can based the above I field or D field to identify the important PDU Set/frame ... "

Figure 6C:
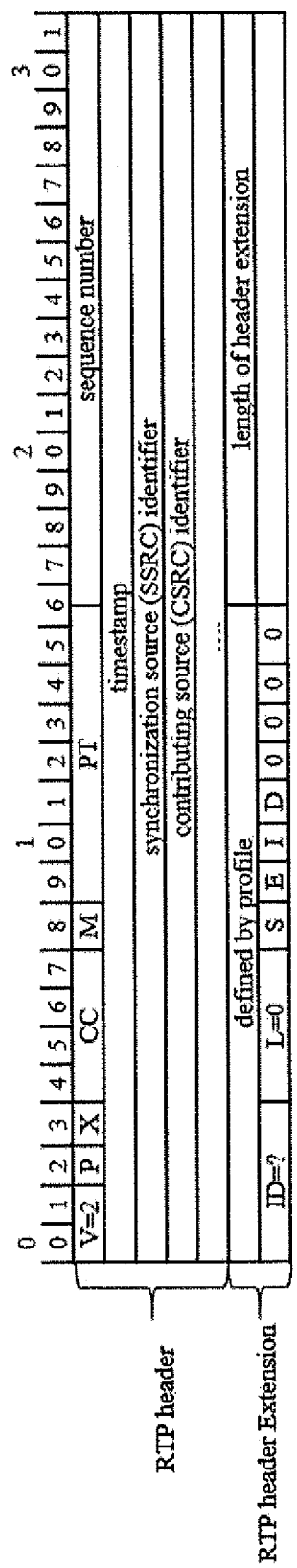
FIG. 6C is a diagram illustrating features as described herein.

FIG. 6C illustrates an example frame marking RTP header extension for non-scalable streams.

Video frame identification may be based on H264 NAL unit header. Solution #24 also proposed to support PDU set/frame identification for H.264 based on its NAL unit header:

" ... For each RTP packet, a H.264 NAL unit header is included following RTP header. For RTP payload carrying H.264 video slices, according to RFC 6184, the H.264 NAL unit header is as following:

. . .

In the NAL unit header, the NRI value indicates the relative transport priority, as determined by the encoder. According to clause 5.3 of RFC6184, a value of 00 indicates that the content of the NAL unit is not used to reconstruct reference pictures. Such NAL units can be discarded without risking the integrity of the reference. Values greater than 00 indicate that the decoding of the NAL unit is required to maintain the integrity of the reference pictures. The highest transport priority is 11, followed by 10, and then by 01; finally, 00 is the lowest.

Therefore, UPF can use the NRI value to identify the importance information of NAL unit carrying the PDU Set/slice. In case the frame includes only one slice, the method can be used to detect the importance of the frame ... "

Figure 6D:
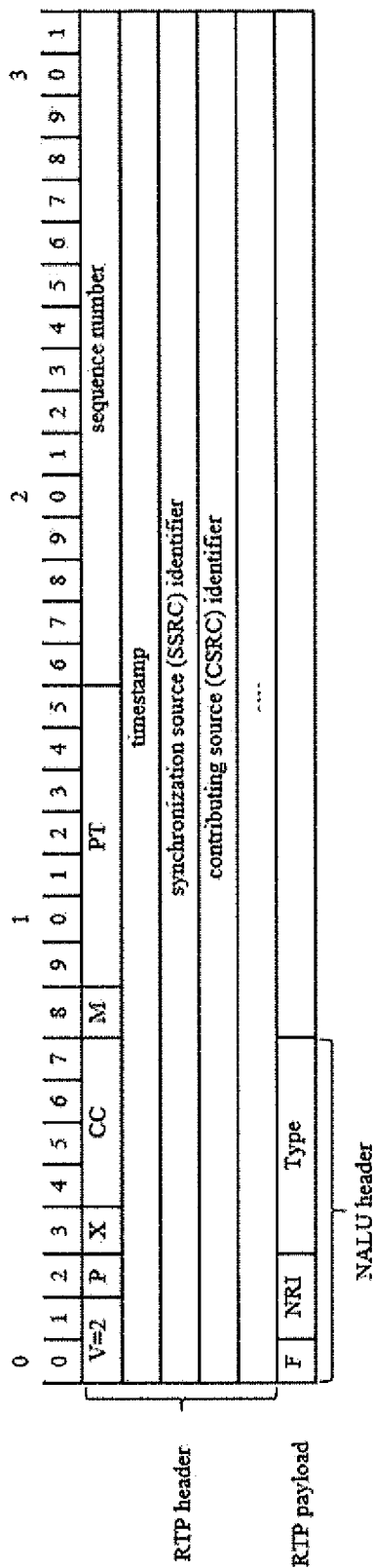
FIG. 6D is a diagram illustrating features as described herein.

FIG. 6D illustrates an example of H.264 unit header format.

Tdoc S4aR230009 [5G_RTP] describes RTP header extension for PDU set marking. Referring now to FIG. 7, illustrated is an example RTP HE for PDU set marking. The semantics of the fields are as follows. ID: identifier of the one-byte extension element. This identifier shall be negotiated using the SDP extmap attribute. L: length minus one of the extension element. This value shall be set to 14. S: this flag shall be set to one for the first PDU of the PDU set. E: this flag shall be set to one for the last PDU of the PDU set. D: this flag shall be set to 1 if it is known to the sender that the PDU may be discarded without significant impact to the reconstructed media. Pri: the priority field indicates the importance of this PDU set compared to other PDU sets within the same stream. The default value shall be 8. Lower values indicate a higher importance PDU set. PSSN: the sequence number of the PDU set to which the current PDU belongs. This value wraps around at 255, however, using the RTP packet sequence number and PSSN pair may be used to uniquely distinguish PDU sets. COUNT: the number of PDUs in this PDU set. The value 0 is used to indicate that the number of PDUs in this PDU set is not known. PSN: the sequence number of the current PDU within the PDU set. A receiver shall use the RTP packet sequence number together with the PSN to detect PDU sets that contain more than 255 PDUs. PSSize: the size in bytes of all PDUs of the PDU set, excluding RTP headers and header extensions, effectively conveying the size of the media data of that PDU set. If unknown, the PSSize field shall be set to 0. k, r: If FEC is used, k and n-k shall convey the number of source and repair packets of the FEC block to which the PDU set belongs. If FEC is not used, these fields shall be set to 0.

It is suggested that the PDU set marking header extension registers the following extension URI with IANA: urn:3gpp: pdu-set-marking.

It may be noted that https://datatracker.ietf.org/doc/draft-ietf-tsvwg-14s-arch/describes network providing feedback about network status. There may be an explicit congestion signaling mechanism. A network element may mark the ECN bit in the IP header to signal congestion. In response, the sender can adapt the transmission rate more quickly and accurately. This can lead to lower buffer occupancy in network and thus reduced queuing delays.

It may be noted that S4-220477 "Cross-layer optimization" states the following:

" ... the gNB MAC layer may carry out error detection and correction through HARQ process and signal HARQ feedback to the UE peer entity. The UE MAC layer may notify WebRTC the erroneous packets directly to avoid error propagation, and the error recovery latency may be reduced since the encoder may generate a new key frame as soon as possible ... "

Figure 8:
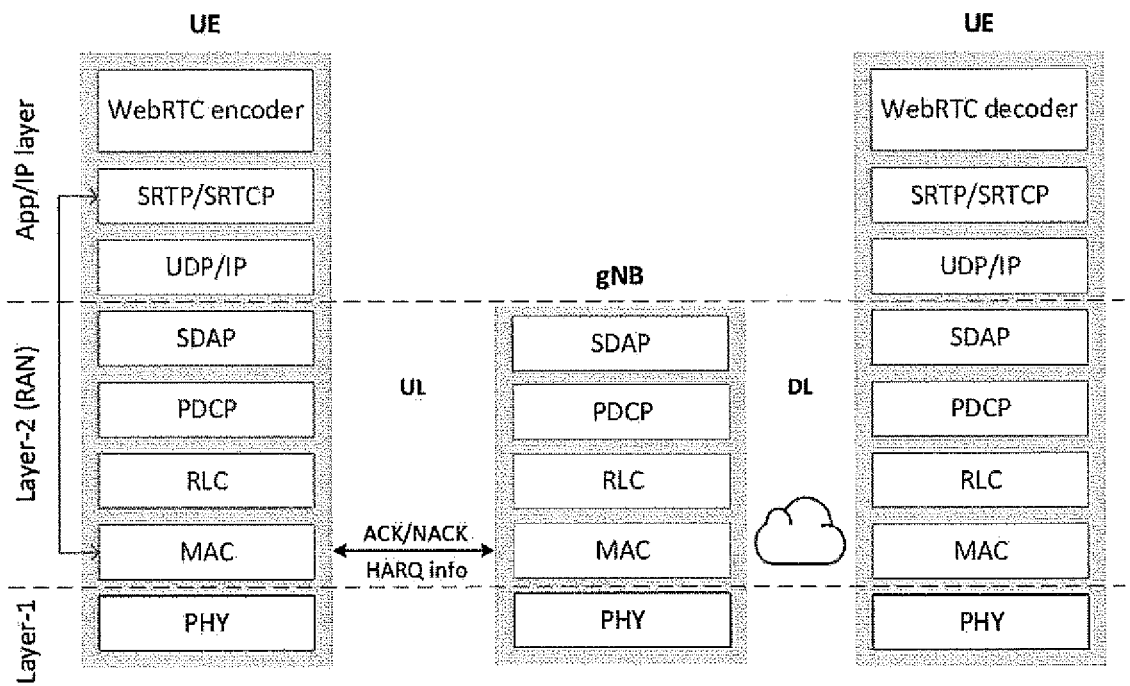
FIG. 8 is a diagram illustrating features as described herein.

FIG. 8 illustrates an example environment in which one or more of the above-described processes may take place.

Features as described herein generally relate to signaling of PDU priority. In an example embodiment, a method for signaling PDU priority may be defined. The PDU priority may be signaled using a mix of non-overlapping application priority bits and network validation, as well as priority bits in the RTP HE, where the application bits may be set by the application before transmitting the RTP packet, and the network bits may be set by any network element(s). The network bits may be set by a single network element or one or more network elements may set different network bits. In the latter case, a single network element may be responsible for validating and setting of a given single network bit. The presence of such network element(s) for validating and setting the network bits is non-limiting. A technical effect of a network element setting the network bits may be to provide application freedom for setting PDU handling bits in the RTP HE as deemed suitable based on the media data carried through the network; applications may be able to rely/assume that the priority bits are set by the sender, and not manipulated by the network. A technical effect of a network element setting the network bits may be to enable the network to validate or invalidate the application bits to avoid unfair usage of priority bits leading to misuse of the PDU priority information. In other words, the network may determine that the application controlled bits are valid, or may determine that the application controlled bits are not valid. If the network element invalidates the application set bits, in an embodiment, the technical effect may be that the network drops the packets with invalidated application-controlled bits. In another implementation embodiment, if the network element invalidates the application bits, the subsequent network elements may treat the PDU with invalidated application-controlled bits as a PDU without PDU handling RTP HE (Header Extension).

In the present disclosure, the terms "application bits" and "application controlled bits" and "application set bits" may be used interchangeably. In the present disclosure, the terms "network bits" and "network controlled bits" and "network set bits" may be used interchangeably.

In an example embodiment, an application may set some initial priority bits in the RTP HE. In an example embodiment, as soon as the packet enters the network, an appropriate network entity (e.g. MGW or UPF) may add the non-overlapping application and network bits according to its policies.

In an example embodiment, the application controlled bits and the network controlled bits may be different in that they may occupy separate bits of an RTP header extension that do not overlap (i.e. nonoverlapping bits). The application controlled bits and the network controlled bits may be contiguous or noncontiguous. The set of application controlled bits and the set of network controlled bits may not share any bits between them.

In an example embodiment, a predefined number of bits in the RTP HE (header extension) may be initially set by the application, with various priority information aspects that indicate application preference (s) for PDU and PDU set handling by the network. For example, a PDU may be necessary for decoding/handling the PDU set, a PDU may be necessary for decoding/handling current and subsequent PDU sets, a PDU may correspond to the base layer of the media (containing multiple layers), a PDU may correspond to the main modality, etc.

In an example embodiment, a predefined number of bits in the RTP HE may be subsequently set by a network element. A part of these bits may be set if the network thinks that the application bits are set in the wrong way. For example, all RTP packets (with a RTP HE) may have a bit set which indicates that the particular PDU is necessary for decoding/handling current and subsequent PDU sets. This may be detected, for example, based on unusual network traffic characteristics. Alternatively, application developers may register their services with the network provider. This may have the technical effect of requiring less monitoring later on.

In an example embodiment, if the network bit that validates the application bits is set to 0, this may indicate to the network that the application bits are invalid. Consequently, the network may operate according to the network bits (e.g. set by the network). For example, a network element may determine that the application bits are incorrect or inconsistent, and the network may treat the packet as without application bits in the RTP HE for PDU handling.

In an example embodiment, if the network bits indicate the application bits are valid, the network may operate according to the application bits in the RTP HE.

In an example embodiment, the receiver may have visibility on both application bits and network bits, and may transmit feedback, for example an appropriate signaling message, to indicate the same to the sender. For example, in case of incorrectly set application bits, the network element or the receiver UE may send a feedback message to inform about the erroneous application bits. For example, the semantics of the feedback message may indicate that the network has overridden the application set bits, since the network may think/determine that this is not the right priority for application bits in the RTP packets. In other words, the feedback message may indicate that the network has determined that the priority indicated with the application controlled bits is invalid.

In an example embodiment, there may be a bit which indicates that the network has rewritten application set bits. The bit may always be zero, unless the network rewrites the application bits. In this case, the application and network bits may be overlapping. The example value of zero is not limiting; another value/indication may be used for the same purpose.

In an example embodiment, the network may set one of the bits in the network bits in RTP HE to indicate about the action to delay the RTP packet.

In an example embodiment, in case of dropping the packet, the network element may directly send a feedback message to the sender about the action taken (dropped packet). Additionally or alternatively, in case of dropping the packet, the network element may set a bit among the network bits and forward the packet without the payload in order to inform the receiver about the action. This may trigger the receiver to request a reduction in bitrate (e.g. reduced resolution, quality, frame rate, etc.). Additionally or alternatively, in case of dropping the packet, the network may set a bit among the network bits for the next packet (that is not dropped) to indicate that the earlier packets were dropped due to some network issue. This may indicate to the receiver that it should no longer wait for packets that precede the marked packet in sequence order (e.g. clear buffer reservations).

In an example embodiment, the network may set a bit among the network bits about the need to reduce bitrate, or indicate network congestion before initiating packet dropping. This may be used by the receiver UE to request a reduction in bitrate. A feedback may be sent by the receiver to indicate reduction in bitrate (e.g. based on network set bits).

In an example embodiment, an intermediate network element may perform processing to handle dependency and priority signaling. In an example embodiment, an intermediate network element (e.g. a media gateway or a UPF) may parse the incoming PDUs of a PDU set and forward the PDUs of a PDU set without modifying any information of the PDUs, or may modify the PDU information based on certain criteria. The following paragraphs provide two scenarios where an intermediate network element may modify the PDU information related to setting the dependency between PDUs of a PDU set, and setting the priority of the PDUs of a PDU set.

In an example embodiment, a PDU set may be received that contains one or more PDUs. The one or more PDUs may carry one or more dependency information. First dependency information may be between one or more PDUs of a given PDU set. Second dependency information may be between one or more PDUs of different PDU sets. A PDU set containing one or more PDUs may be output. The output PDU set may carry one or more dependency information. The one or more dependency information may be modified based on certain criteria. The criteria may be based on changes in the network conditions (e.g. creating the dependency for better handling of PDU sets). First dependency information may be between one or more PDUs of a given PDU set. Second dependency information may be between one or more PDUs of different PDU sets.

In an example embodiment, a PDU set may be received that contains one or more PDUs. The one or more PDUs may carry one or more levels of priority information. First priority information may be configured to be used when there is a delay in the PDU delivery. Second priority information may be configured to be used when the PDU is to be discarded. Based on the received PDU set, a PDU set containing one or more PDUs may be output. The one or more PDUs of the output PDU set may carry one or more levels of priority information. The one or more levels of priority information may be modified based on certain criteria. The criteria may be based on changes in the network conditions (e.g. updating the priority for better handling of PDU sets). First priority information may be configured to be used when there is a delay in the PDU delivery. Second priority information may be configured to be used when the PDU is to be discarded.

Figure 9:
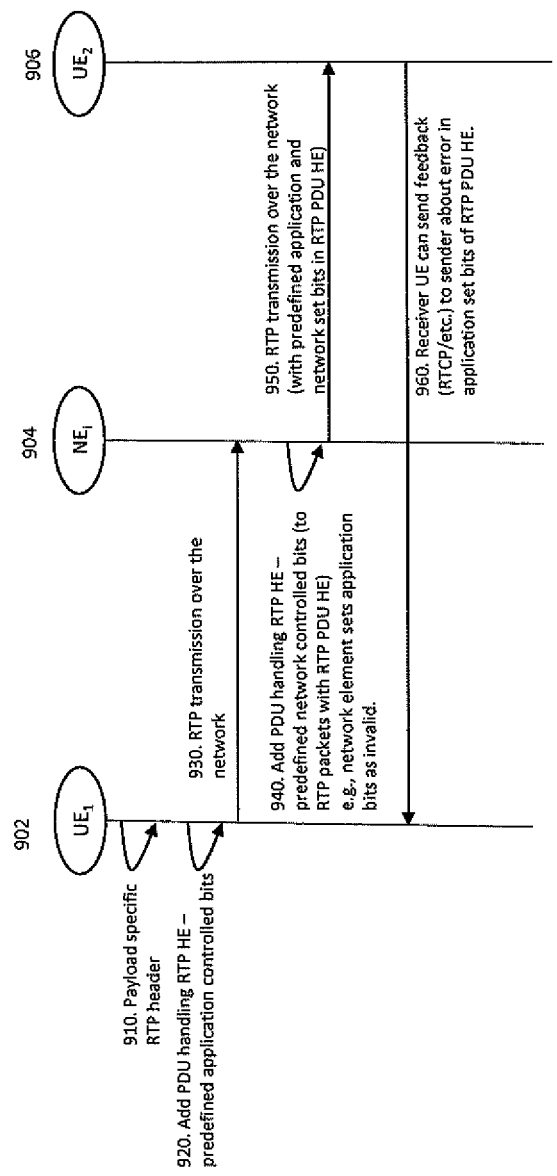
FIG. 9 is a flowchart illustrating steps as described herein.

Referring now to FIG. 9, illustrated is an example signaling flow for implementing the PDU handling RTP HE with application set bits and network or network element set bits, according to example embodiment(s) of the present disclosure. FIG. 9 describes predefined application set bits and network element set bits that indicate error in the application bits in RTP PDU HE. At 910, for RTP based delivery, the application at UE1 (902) may encapsulate the media payload according to the RTP payload specification, where applicable, and/or may add an RTP header extension for providing information about the payload (for example the media payload is a H.265 encoded video frame and the application adds the H.265 related RTP header extension as specified in RFC 7798). At 920, the application at UE1 (902) may add a PDU handling related RTP header extension to assist the network element NEi (904) in performing the task of transporting the payload data through the network. The PDU handling RTP HE may comprise the application bits, or bits that may be set by the application, as well as the network bits, which may be set by a network element, for example NEi (904). At 930, the RTP packet may be transmitted over the network. At 940, the RTP packet may be subsequently parsed in the network by a suitable network element NEi (904) in order to inspect the application bits, as well as set the network bits in the PDU handling RTP HE. The ideal location for adding the network bits may be as early as possible after entering the network. For example, the network element NEi (904) may be a MGW (media gateway) or the UPF (user plane function), RTP relay, etc. in order to validate the application bits at the earliest opportunity. This may have the technical effect of benefitting subsequent network elements, which may be able to leverage the validation of the application bits. At 950, the network element NEi (904) may forward the received RTP packet with the network bits now set. At 960, in case the network bits indicate an error or invalid application set bits in the RTP HE, the receiver UE2 (906) may send feedback via RTCP, or any other suitable method, to the sender UE1 (902) to apprise/alert about the invalid or erroneous application bits. Another technical effect of early validation and early action by the network elements based on the application and network bits may be facilitation of early decision in case of dropping of packets. A late decision is inefficient because this may result in dropping an important packet (e.g. PDU which is required for decoding other PDUs in the PDU set) after transmission of earlier PDUs.

In an example embodiment, the PDU handling RTP HE may be added by the application server (AS) or UPF, in addition to the UE. The AS or UPF may also add RTP PDU HE even if it is not added by the UE. For example, a UE in RTC session may not add PDU handling RTP HE, however, the UPF after the UL may add the RTP PDU HE.

In an example embodiment, the AS or UPF may validate and/or modify the application set bits.

In an example embodiment, the UE may add the PDU handling RTP HE, and the uplink UE may then validate the RTP HE. If an AS exists in the path, it may modify the RTP HE before delivering it to the UPF of the downlink, which may then process it. The SDP may indicate, for the PDU handling RTP HE, an extension attribute to indicate that both network and application bits are used.

Figure 11A:
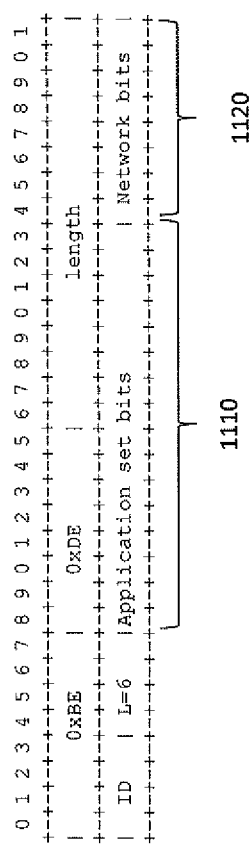
FIG. 11A is a diagram illustrating features as described herein.
Figure 11B:
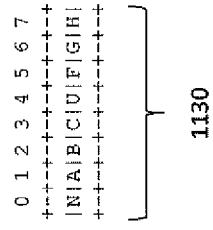
FIG. 11B is a diagram illustrating features as described herein.

FIG. 10A illustrates the PDU handling RTP HE comprising application set bits (1010) and the network set bits (1020). FIG. 10B illustrates the network set bits (1030). FIGS. 11A-B illustrate a shorter version of PDU handling RTP HE, including application set bits (1110) and network set bits (1120, 1130). The network priority bits F, G, H are relevant for the subsequent network elements independent of whether the application bits have been validated or not/invalidated (e.g. N is equal to 1 and A is equal to 1 or 0). Thus, the composite RTP HE comprising application set bits and network bits together may provide information to the network elements for PDU handling. The application bit details are skipped in the present disclosure. The details of each network bit are described in TABLE 3 below:

TABLE 3

| Flag | Semantics |
|---|---|
| N | If the value is equal to 0, it indicates that the network bits have not yet been set by the network element. The network element sets the bit to 1 after setting network bits in the RTP HE. Furthermore, if the first network element receives a packet from a UE with flag N bit set, the network may mark the application as malicious for reporting purposes or treat the traffic appropriately. It should also set the flag N bit to 1 if the traffic is allowed without modification of application bits and flag A bit to 0. |
| A | This value is always equal to 0 if the value of flag N is equal to 0. If this value is equal to 1 and flag N is equal to 1, it indicates that the application set bits have been validated by the network element. If the value of flag N is equal to 1 and the value of flag A is equal to 0, indicates the application set bits have been invalidated by the network element. |

TABLE 3-continued

| Flag | Semantics |
|---|---|
| B | This value is equal to 1 if the network element mirrors the application bit indicating PDU required for current PDU set and subsequent PDU set successful decoding or consumption/handling. This flag may be relevant if the flag A bit is equal to 0. This approach allows processing of PDUs even if the flag A bit is set to 0 with the help of network set bits. |
| C | This value is equal to 1 if the network element mirrors the application bit indicating PDU required for current PDU set consumption. This flag may be relevant if the flag A bit is equal to 0. This approach allows processing of PDUs even if the flag A bit is set to 0 with the help of network set bits. |
| U | This flag equal to 0 indicates that the application bits have been unchanged. If the value is 1 it indicates that the application bits have been over-written by the network. Unless specifically agreed (e.g., enabling network to modify application bits), this flag is always equal to 0. |
| F | Network congestion indication. The indication is for the receiver to expect increased network congestion and consequently expected to reduce the requested bitrate. |
| G | Network action indication to delay transmission of packet. If this value is equal to 1, the packet has been delayed for a duration greater than, for example, the PDU set delay budget. |
| H | Network action indication flag packet to be dropped by subsequent network elements if required. If this flag is equal to 1, the packet has been marked as a candidate for dropping by the subsequent network elements, if the situation arises. This may be helpful in maintaining fair handling of different flows. Consequently, the scheduler may use this information subsequently. |
| I | Reserved |
| J | Reserved |
| K | Reserved |
| L | Reserved |
| M | Reserved |
| N | Reserved |
| O | Reserved |
| P | Reserved |

The names of the flags in the above table are used for illustrating the example and is non-limiting; any other names may be used.

Figure 12:
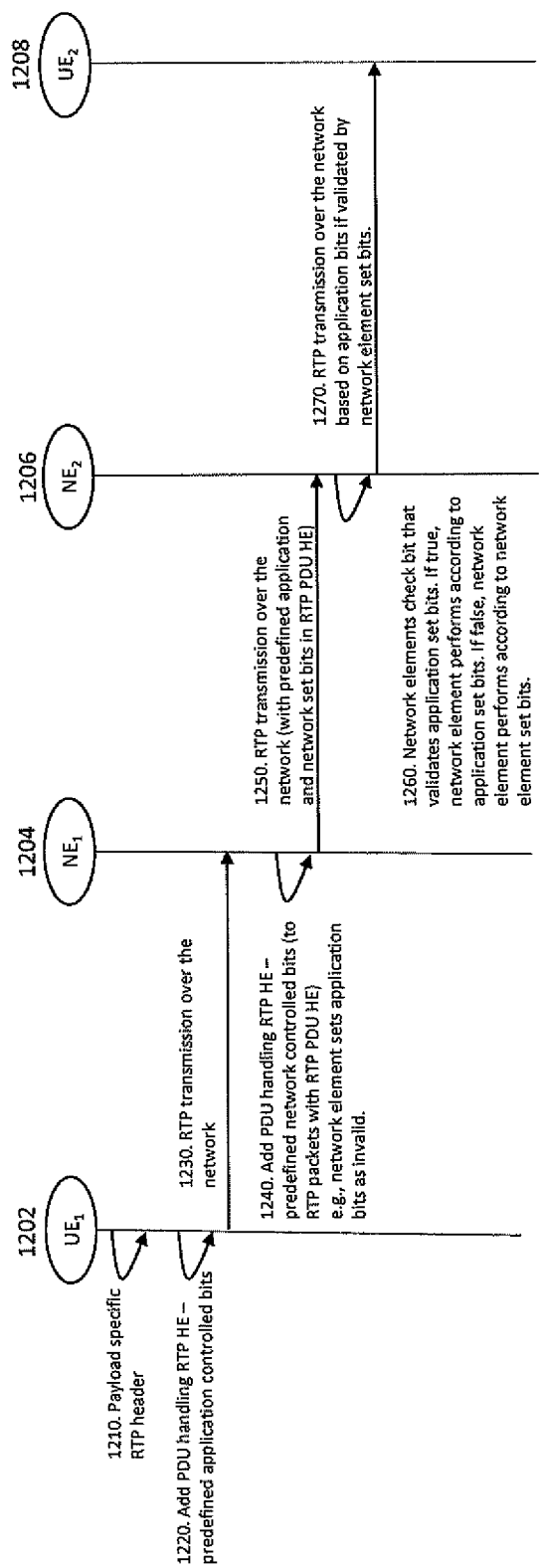
FIG. 12 is a flowchart illustrating steps as described herein.

Referring now to FIG. 12, illustrated is an example signaling flow describing the network behavior based on the validation action of the application bits performed by a network element (e.g. network bit validation/invalidation of application bits in RTP PDU HE). Steps 1210-1240 are similar to steps 910-940 of FIG. 9, and so will not be described again. NE1 (1204) and NE2 (1206) may each be a MGW (media gateway) or the UPF (user plane function), RTP relay, etc. The additional aspect represented here is as follows: if the network validation bits flag N and flag A is set to 1 by NE1 (1204), the NE2 (1206) may perform action based on the application set bits.

At 1250, the NE1 (1204) may perform RTP transmission over the network to NE2 (1206) (e.g. with predefined application and network set bits in RTP PDU HE). At 1260, network element NE2 (1206) may check a bit that validates application set bits. If true, NE2 (1206) may perform according to application set bits. If false, NE2 (1206) may perform according to network element set bits. The RTP packet transmission may be impacted depending on whether the network bit flag N is valid or invalid (i.e. network element validation action) and subsequently setting the flag A (application bit validation) equal to 1 (valid) or 0 (invalid). In case the flag A bit is equal to 1, the subsequent network elements may prioritize PDUs based on the application set bits in the RTP HE. In addition, the network element may consider (reading or setting) the network set bits flags F, G, H because they may provide information that is not provided or known by the application set bits. Alternatively, if the flag A bit is equal to 0, the subsequent network elements may prioritize PDUs by disregarding the application bits in the RTP HE related to PDU handling. In this case the network element may consider flags B, C, F as well as setting or reading the flags F, G, H bits. At 1270, the NE2 (1206) may perform RTP transmission over the network, to UE2 (1208), based on application bits if validated by network element set bits. If the network element invalidates the application set bits (flag N is 1 and flag A is 0), in an embodiment, the technical effect may be that the network drops the packets with invalidated application-controlled bits. In another implementation embodiment, if the network element invalidates the application (flag N is 1 and flag A is 0), the subsequent network elements may treat the PDU with invalidated application-controlled bits as a PDU without PDU handling RTP HE (header extension).

Figure 13:
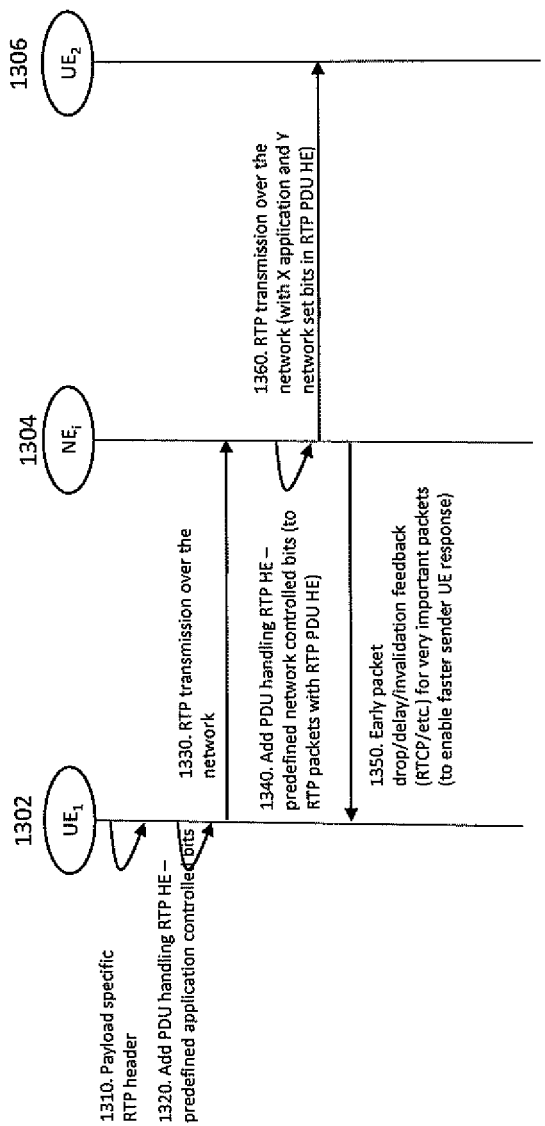
FIG. 13 is a flowchart illustrating steps as described herein.

Referring now to FIG. 13, illustrated is an example signaling flow describing predefined application set bits. The network element NEi (1304) may validate but drop a very important packet. The network element NEi (1304) may send feedback to inform sender UE1 (1302), and request faster response to packet loss (e.g. sender UE1 (1302) may deliver FIR faster than usual receiver UE2 (1306) FIR). Steps 1310-1340 are similar to steps 910-940 of FIG. 9, and so will not be described again. NEi (1304) may be a MGW (media gateway) or the UPF (user plane function), RTP relay, etc.

At 1360, the NE1 (1304) may perform RTP transmission over the network to the UE2 (1306), for example with X application and Y network set bits in RTP PDU HE.

In some implementation embodiments, the network element NEi (1304) may also signal the receiver UE2 (1306) about a delayed high priority packet to avoid a FIR request due to delay being considered as packet loss. However, in order to maximally benefit with early feedback, the action to drop packets should occur as early in the network traversal as possible. The additional benefit of dropping packets early (if and when necessary) may be to avoid the "wasteful" handling of the packet by the network (e.g. dropping the packet at the last hop may lead to handling of the packet by the earlier stages without finally being consumed by the receiver UE2 (1306)).

At 1350, the NE1 (1304) may transmit, to the UE1 (1302), early packet drop/delay/invalidation feedback (RTCP/etc.) for very important packets (to enable faster sender UE response).

In FIG. 13, the PDU handling RTP HE may be used by the network element NEi (1304) to indicate to the sender UE1 (1302) about dropping/delaying or invalidating application set bits in a high priority RTP packet (e.g. at 1350). This may have the technical effect of providing an early feedback for the sender UE1 (1302) to retransmit a reference picture or reconfigure its frame marking practices.

In an example embodiment, the PDU handling RTP HE may be declared in the session negotiation stage and may carry different variations. If the attribute is present at the session level, it may be applicable to all the RTP based media streams. On the other hand, if the attribute is present at the media level, it may be applicable only to the relevant media lines.

A session description with attribute "pdu_rtp_he" with value equal to 0 or no value may indicate PDU handling RTP HE to be used by the media sender UE, with no feedback messages from receiver UE:

a=pdu_rtp_he:<value>

The application may set the application bits, and the network may set the network bits.

A session description with attribute "pdu_rtp_he" with value equal to 1 may indicates PDU handling RTP HE to be used by the media sender UE with feedback messages from the receiver UE. The application may set the application bits, and the network may set the network bits.

a=pdu_rtp_he:1
a=rtcp-fb:<PT> pdu_fb_ue

Figure 14:
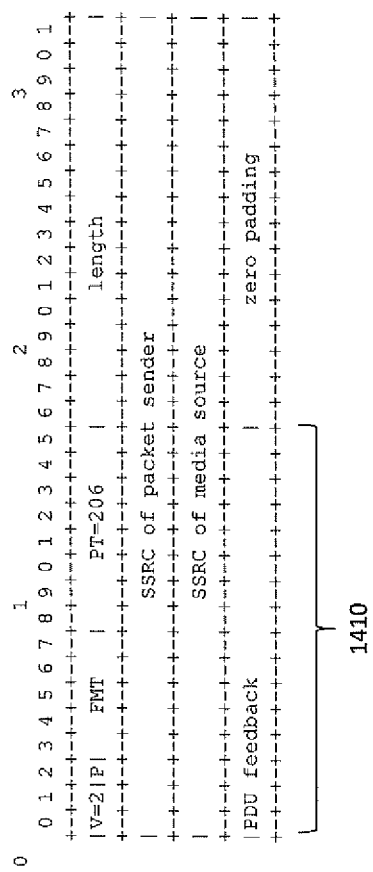
FIG. 14 is a diagram illustrating features as described herein.

The UE or network element feedback control information regarding PDU handling RTP HE is illustrated in FIG. 14. FIG. 14 illustrates the format for loss of packets with RTP PDU handling HE. The feedback control information (FCI) may be used by the receiver UE based on the valid/invalid or network status flags set in the RTP PDU HE. In addition, the FCI may be useful to provide early feedback to the sender UE. For example, this may have the technical effect of hastening the encoding and delivery of a new reference picture for successful packet loss recovery.

The RTCP feedback may carry information about the invalid bits as a response to the invalidation of application set bits by the network element. The RTCP feedback message may indicate that the erroneously set bits completes the loop between the sender U and the receiver U. The RTCP feedback information may be formatted as follows: flags followed by RTP PDU HE or application set bits or a subset of application set bits.

The PDU feedback information may be formatted as shown in TABLE 4 below:

TABLE 4

| Flag | Semantics |
| --- | --- |
| A | when this flag is set to 1 it indicates that the receiver UE Invalidated the application bits in the RTP PDU HE. alternatively when this flag is set to 1 it indicates that the receiver UE received RTP packets containing PDU handling HE in which the application bits are Invalidated in the RTP PDU HE. |

TABLE 4-continued

| Flag | Semantics |
| --- | --- |
| I | This flag is set to 1 if a PDU is dropped that is necessary for the processing of other PDUs in the PDU set to which it belongs. |
| R | This flag is set to 1 if a PDU is dropped that is necessary for the processing of some of other PDUs in other PDU sets to which it does not belong. |
| P | This flag is set to 1 if a PDU is dropped that is necessary for the processing of all the other PDUs in other PDU sets to which it does not belong. For example, PDUs carrying sequence parameter sets or common atlas data of V3C bitstream. |
| U | PDU delayed beyond PSDB indication flag. |
| F | Network congestion indication flag. The indication is for the receiver to expect increased network congestion and consequently expected to reduce the requested bitrate. |
| G | Reserved |
| H | Reserved |
| I | Reserved |
| J | Reserved |
| K | Reserved |
| L | Reserved |
| M | Reserved |
| N | Reserved |
| O | Reserved |
| P | Reserved |

In accordance with an example embodiment, the RTP HE for PDU handling containing the application bits and the network bits may be realized using the two-byte header form as defined in RFC 8285.

Figure 15A:
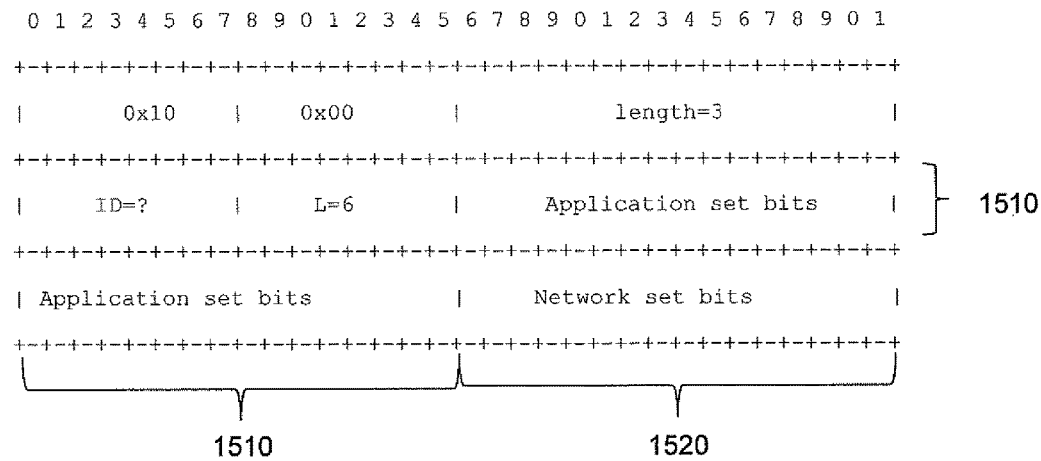
FIG. 15A is a diagram illustrating features as described herein.

FIG. 15A illustrates the PDU handling RTP HE comprising application set bits (1510) and the network set bits (1520).

In accordance with an example embodiment, the RTP HE for PDU handling may always contain the application bits and optionally contain the network bits (i.e. network bits may not be included). The length field L indicating the length of the extension data may indicate the presence or absence of the network bits in the RTP HE.

Figure 15B:
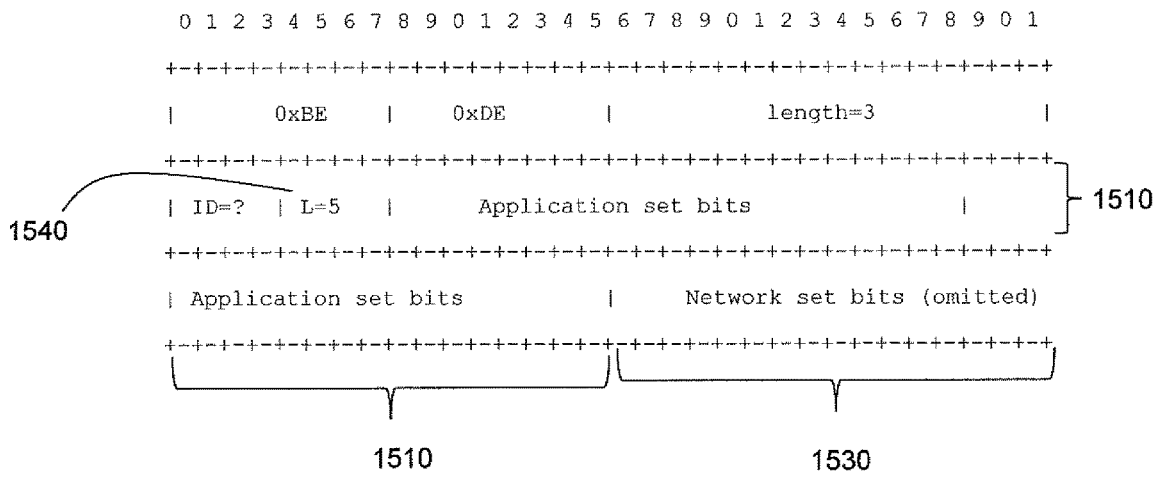
FIG. 15B is a diagram illustrating features as described herein.

FIG. 15B illustrates the PDU handling RTP HE comprising only the application set bits (1510), where the network set bits (1530) are omitted. The length L with value 5 (1540) indicates that the network bits are not present in the RTP HE, as compared to length L=6 in FIG. 10A, which has the network bits present.

In accordance with an example embodiment, the RTP HE for PDU handling may contain the network bits at the start of the extension data, followed by the application bits.

Figure 15C:
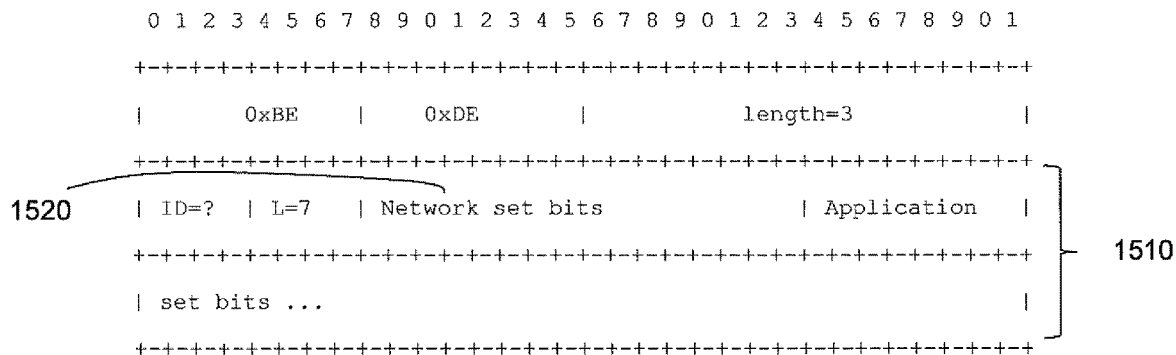
FIG. 15C is a diagram illustrating features as described herein.

FIG. 15C illustrates the PDU handling RTP HE comprising the network set bits (1520) at the start of the extension data, followed by the application set bits (1510). In an example deployment scenario, a UE may create a PDU with RTP HE containing the network bits at the start of the extension data, followed by the application bits. The RTP packet may be transmitted over the network. The RTP packet may be subsequently parsed in the network by a suitable network element NE in order to inspect the application bits (deep packet analysis), as well as set the network bits in the PDU handling RTP HE. The network element may forward the received RTP packet with the network bits now set. The subsequent network elements may now have to parse only a portion of the RTP HE to check for the network bits. This case may have the technical effect of helping the subsequent network elements by reducing the deep packet analysis, which otherwise may increase the delay of the RTP packet delivery to the receiver UE.

In accordance with an example embodiment, the RTP HE for PDU handling may contain the network bits sandwiched between two or more sets of application bits.

Figure 15D:
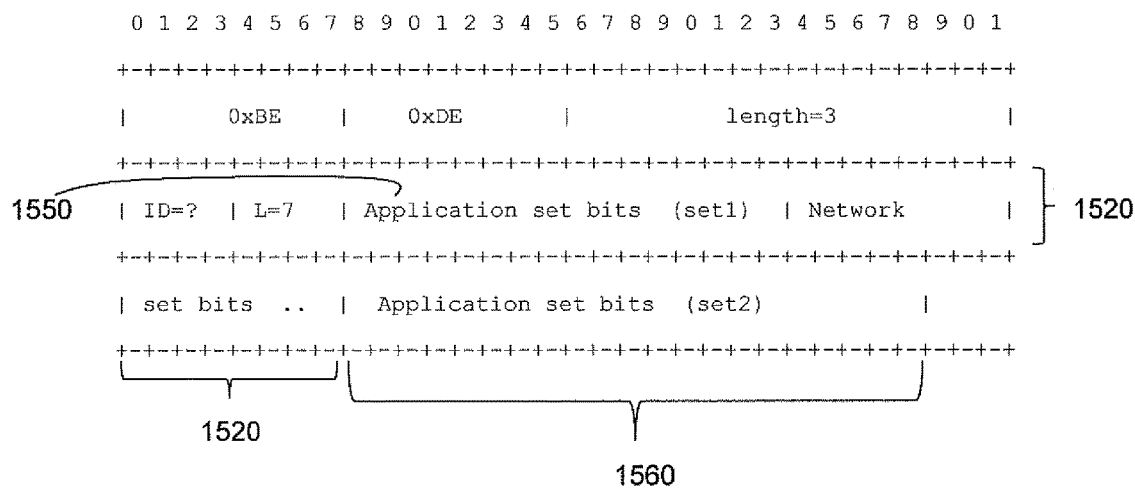
FIG. 15D is a diagram illustrating features as described herein.

FIG. 15D illustrates the PDU handling RTP HE comprising the network set bits (1520) sandwiched between two sets of the application set bits, application set bits (set1) (1550), application set bits (set2) (1560). The application set bits in set2 (1560) may be optionally present in the RTP HE. The presence or absence of application set bits set 2 (1560) may be determined by the length L field indicating the length of the extension data. In an alternate embodiment, the presence or absence of application set bits in set2 (1560) or more may be indicated by the corresponding bits in the application set bits of set 1 (1550).

Figure 16:
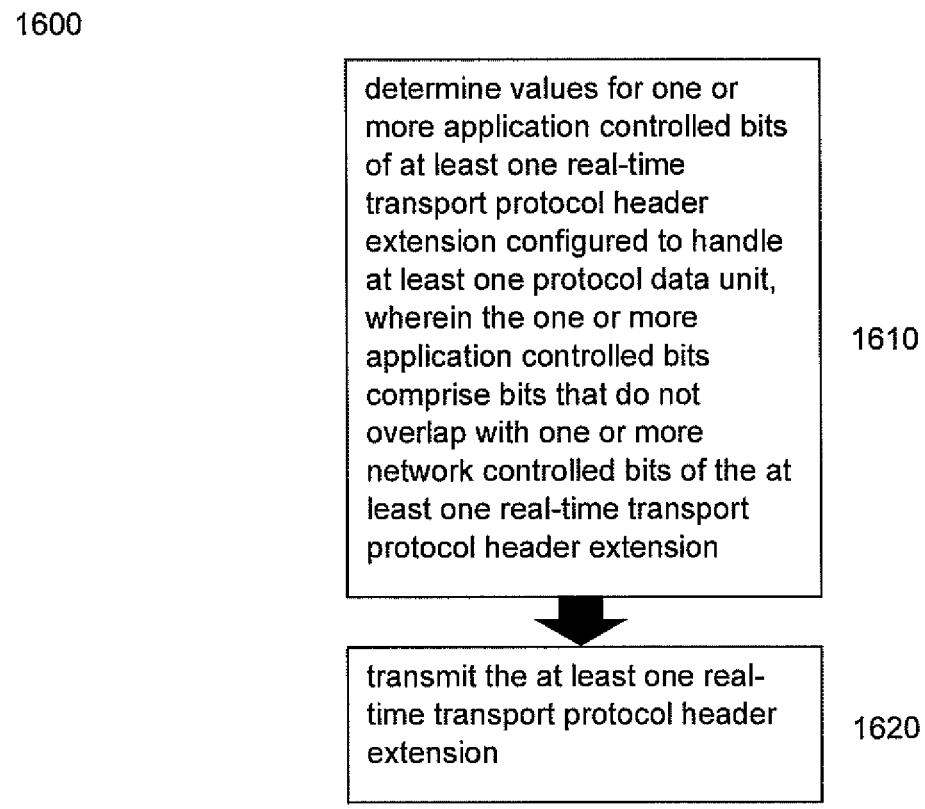
FIG. 16 is a flowchart illustrating steps as described herein.

FIG. 16 illustrates the potential steps of an example method 1600. The example method 1600 may include: determining values for one or more application controlled bits of at least one real-time transport protocol header extension configured to handle at least one protocol data unit, wherein the one or more application controlled bits comprise bits that do not overlap with one or more network controlled bits of the at least one real-time transport protocol header extension, 1610; and transmitting the at least one real-time transport protocol header extension, 1620. The example method 1600 may be performed, for example, with a sending/transmitting UE.

FIG. 17 illustrates the potential steps of an example method 1700. The example method 1700 may include: receiving, from a first user equipment, at least one real-time transport protocol header extension configured to handle at least one protocol data unit, wherein the at least one real-time transport protocol header extension comprises, at least, one or more application controlled bits, 1710; determining whether the one or more application controlled bits are valid, 1720; and setting values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits, 1730. The example method 1700 may be performed, for example, with a network element, EPF, MGW, RTP relay, etc.

FIG. 18 illustrates the potential steps of an example method 1800. The example method 1800 may include: receiving, from a first user equipment, at least one real-time transport protocol header extension configured to handle at least one protocol data unit, wherein the at least one real-time transport protocol header extension comprises, at least, one or more application controlled bits and one or more network controlled bits, wherein the one or more application controlled bits comprise bits that do not overlap with the one or more network controlled bits, 1810; determining whether the one or more application controlled bits are valid, 1820; in response to a determination that the one or more application controlled bits are valid, transmit the protocol data unit to a second user equipment based, at least partially, on the one or more application controlled bits, 1830; and in response to a determination that the one or more application controlled bits are invalid, transmit the protocol data unit to a second user equipment based, at least partially, on the one or more network controlled bits, 1840. The example method 1800 may be performed, for example, with a network element, EPF, MGW, RTP relay, etc.

In accordance with one example embodiment, an apparatus may comprise: at least one processor; and at least one memory storing instructions that, when executed by the at least one processor, cause the apparatus at least to: determine values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and transmit the at least one real-time transport protocol header extension.

The one or more network controlled bits may comprise at least one of: an indication of validation performed or not performed, an indication of whether the one or more application controlled bits are valid or invalid, an indication of protocol data unit handling priority determined with a network element, an indication of a network congestion status, or an indication of a network action.

The one or more application controlled bits may be configured to indicate a priority associated with at least part of a protocol data unit set.

The example apparatus may be further configured to: receive an indication that at least one of the one or more application controlled bits was determined to be invalid.

In accordance with one aspect, an example method may be provided comprising: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and transmitting the at least one real-time transport protocol header extension.

In accordance with one example embodiment, an apparatus may comprise: circuitry configured to perform: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and circuitry configured to perform: transmitting the at least one real-time transport protocol header extension.

In accordance with one example embodiment, an apparatus may comprise: processing circuitry; memory circuitry including computer program code, the memory circuitry and the computer program code configured to, with the processing circuitry, enable the apparatus to: determine values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and transmit the at least one real-time transport protocol header extension.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and transmitting the at least one real-time transport protocol header extension.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: determine, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and cause transmitting of the at least one real-time transport protocol header extension.

In accordance with one example embodiment, a non-transitory computer-readable medium comprising program instructions stored thereon for performing at least the following: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and causing transmitting of the at least one real-time transport protocol header extension.

In accordance with another example embodiment, a non-transitory program storage device readable by a machine may be provided, tangibly embodying instructions executable by the machine for performing operations, the operations comprising: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and causing transmitting of the at least one real-time transport protocol header extension.

In accordance with another example embodiment, a non-transitory computer-readable medium comprising instructions that, when executed by an apparatus, cause the apparatus to perform at least the following: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and causing transmitting of the at least one real-time transport protocol header extension.

A computer implemented system comprising: at least one processor and at least one non-transitory memory storing instructions that, when executed by the at least one processor, cause the system at least to perform: determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and causing transmitting of the at least one real-time transport protocol header extension.

A computer implemented system comprising: means for determining, with a user equipment, values for one or more application controlled bits of at least one real-time transport protocol header extension configured to handle at least one protocol data unit, wherein the one or more application controlled bits may comprise bits that do not overlap with one or more network controlled bits of the at least one real-time transport protocol header extension; and means for causing transmitting of the at least one real-time transport protocol header extension.

In accordance with one example embodiment, an apparatus may comprise: at least one processor; and at least one memory storing instructions that, when executed by the at least one processor, cause the apparatus at least to: receive, from a first user equipment, at least one real-time transport protocol header extension configured to handle at least one protocol data unit, wherein the at least one real-time transport protocol header extension may comprise, at least, one or more application controlled bits; determine whether the one or more application controlled bits are valid; and set values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

The one or more network controlled bits may comprise at least one of: an indication of validation performed or not performed, an indication of whether the one or more application controlled bits are valid or invalid, an indication of protocol data unit handling priority determined with a network element, an indication of a network congestion status, or an indication of a network action.

The example apparatus may be further configured to: transmit, to a second user equipment, the at least one real-time transport protocol header extension.

The example apparatus may be further configured to: perform protocol data unit handling prioritization based on the one or more application controlled bits in response to a determination that the one or more application controlled bits are valid.

The example apparatus may be further configured to: perform protocol data unit handling prioritization based on the one or more network controlled bits in response to a determination that the one or more application controlled bits are invalid.

The example apparatus may be further configured to: discard the at least one protocol data unit in response to a determination that the one or more application controlled bits are invalid.

The example apparatus may be further configured to: forward the at least one protocol data unit in response to a determination that the one or more application controlled bits are invalid.

The values for the one or more network controlled bits may be configured to indicate that the one or more application controlled bits are invalid.

The example apparatus may be further configured to: determine that the one or more application controlled bits are valid; determine to at least one of: drop transmission of the at least one protocol data unit, or delay the transmission of the at least one protocol data unit; and cause transmission, to the first user equipment, of an indication of dropping or delaying the transmission of the at least one protocol data unit.

The example apparatus may be further configured to: transmit, to a second user equipment, at least one of the one or more network controlled bits and at least one of the one or more application controlled bits.

The example apparatus may be further configured to: determine that at least one of the one or more application controlled bits are invalid; and rewrite the at least one application controlled bit.

The example apparatus may be further configured to: transmit, to a second user equipment, the one or more application controlled bits and the one or more network controlled bits without the at least one protocol data unit.

In accordance with one aspect, an example method may be provided comprising: receiving, from a first user equipment, at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, an apparatus may comprise: circuitry configured to perform: receiving, from a first user equipment, at least one real-time transport protocol header extension configured to handle at least one protocol data unit, wherein the at least one real-time transport protocol header extension may comprise, at least, one or more application controlled bits; circuitry configured to perform: determining whether the one or more application controlled bits are valid; and circuitry configured to perform: setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, an apparatus may comprise: processing circuitry; memory circuitry including computer program code, the memory circuitry and the computer program code configured to, with the processing circuitry, enable the apparatus to: receive, from a first user equipment, at least one real-time transport protocol header extension configured to handle at least one protocol data unit, wherein the at least one real-time transport protocol header extension may comprise, at least, one or more application controlled bits; determine whether the one or more application controlled bits are valid; and set values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, an apparatus may comprise means for performing: receiving, from a first user equipment, at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, a non-transitory computer-readable medium comprising instructions stored thereon which, when executed with at least one processor, cause the at least one processor to: cause receiving, from a first user equipment, of at least one real-time transport protocol header extension configured to handle at least one protocol data unit, wherein the at least one real-time transport protocol header extension may comprise, at least, one or more application controlled bits; determine whether the one or more application controlled bits are valid; and set values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, a non-transitory computer-readable medium comprising program instructions stored thereon for performing at least the following: causing receiving, from a first user equipment, of at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with another example embodiment, a non-transitory program storage device readable by a machine may be provided, tangibly embodying instructions executable by the machine for performing operations, the operations comprising: causing receiving, from a first user equipment, of at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with another example embodiment, a non-transitory computer-readable medium comprising instructions that, when executed by an apparatus, cause the apparatus to perform at least the following: causing receiving, from a first user equipment, of at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

A computer implemented system comprising: at least one processor and at least one non-transitory memory storing instructions that, when executed by the at least one processor, cause the system at least to perform: causing receiving, from a first user equipment, of at least one real-time transport protocol header extension configured to handle at least one protocol data unit, wherein the at least one real-time transport protocol header extension may comprise, at least, one or more application controlled bits; determining whether the one or more application controlled bits are valid; and setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

A computer implemented system comprising: means for causing receiving, from a first user equipment, of at least one real-time transport protocol header extension configured to handle at least one protocol data unit, wherein the at least one real-time transport protocol header extension may comprise, at least, one or more application controlled bits; means for determining whether the one or more application controlled bits are valid; and means for setting values for one or more network controlled bits of the at least one real-time transport protocol header extension based, at least partially, on a determination of whether the one or more application controlled bits are valid, wherein the one or more application controlled bits may comprise bits that do not overlap with the one or more network controlled bits.

In accordance with one example embodiment, an apparatus may comprise: at least one processor; and at least one memory storing instructions that, when executed by the at least one processor, cause the apparatus at least to: receive, from a first user equipment, at least one real-time transport protocol header extension configured to handle at least one protocol data unit, wherein the at least one real-time transport protocol header extension may comprise, at least, one or more application controlled bits and one or more network controlled bits, wherein the one or more application controlled bits may comprise bits that do not overlap with the one or more network controlled bits; determine whether the one or more application controlled bits are valid; in response to a determination that the one or more application controlled bits are valid, transmit the protocol data unit to a second user equipment based, at least partially, on the one or more application controlled bits; and in response to a determination that the one or more application controlled bits are invalid, transmit the protocol data unit to a second user equipment based, at least partially, on the one or more network controlled bits.

The one or more network controlled bits may comprise at least one of: an indication of validation performed or not performed, an indication of whether the one or more application controlled bits are valid or invalid, an indication of protocol data unit handling priority determined with a network element, an indication of a network congestion status, or an indication of a network action.

The example apparatus may be further configured to: determine that the one or more application controlled bits are invalid based, at least partially, on the one or more network controlled bits.

The example apparatus may comprise one of: a network element, a media gateway, or a user plane function.

In accordance with one aspect, an example method may be provided comprising: receiving, from a first user equipment, at least one real-time transport protocol header extension configured to handle at least one protocol data unit, wherein the at least one real-time transport protocol header extension may comprise, at least, one or more application controlled bits and bits and one or more network controlled bits, wherein the one or more application controlled bits may comprise bits that do not overlap with the one or more network controlled bits; determining whether the one or more application controlled bits are valid; in response to a determination that the one or more application controlled bits are valid, transmitting the protocol data unit set to a second user equipment based, at least partially, on the one or more application controlled bits; and in response to a determination that the one or more application controlled bits are invalid, transmitting the protocol data unit set to a second user equipment based, at least partially, on the one or more network controlled bits.

In accordance with one example embodiment, an apparatus may comprise: circuitry configured to perform: receiving, from a first user equipment, at least one real-time transport protocol header extension configured to handle at least one protocol data unit, wherein the at least one real-time transport protocol header extension may comprise, at least, one or more application controlled bits and bits and one or more network controlled bits, wherein the one or more application controlled bits may comprise bits that do not overlap with the one or more network controlled bits; circuitry configured to perform: determining whether the one or more application controlled bits are valid; circuitry configured to perform: in response to a determination that the one or more application controlled bits are valid, transmitting the protocol data unit set to a second user equipment based, at least partially, on the one or more application controlled bits; and circuitry configured to perform: in response to a determination that the one or more application controlled bits are invalid, transmitting the protocol data unit set to a second user equipment based, at least partially, on the one or more network controlled bits.

In accordance with one example embodiment, an apparatus may comprise: processing circuitry; memory circuitry including computer program code, the memory circuitry and the computer program code configured to, with the processing circuitry, enable the apparatus to: receive, from a first user equipment, at least one real-time transport protocol header extension configured to handle at least one protocol data unit, wherein the at least one real-time transport protocol header extension may comprise, at least, one or more application controlled bits and one or more network controlled bits, wherein the one or more application controlled bits may comprise bits that do not overlap with the one or more network controlled bits; determine whether the one or more application controlled bits are valid; in response to a determination that the one or more application controlled bits are valid, transmit the protocol data unit to a second user equipment based, at least partially, on the one or more application controlled bits; and in response to a determination that the one or more application controlled bits are invalid, transmit the protocol data unit to a second user equipment based, at least partially, on the one or more network controlled bits.

In accordance with one example embodiment, an apparatus may comprise means for performing: receiving, from a first user equipment, at least one real-time transport protocol header extension configured to handle at least one protocol data unit, wherein the at least one real-time transport protocol header extension may comprise, at least, one or more application controlled bits and one or more network controlled bits, wherein the one or more application controlled bits may comprise bits that do not overlap with the one or more network controlled bits; determining whether the one or more application controlled bits are valid; in response to a determination that the one or more application controlled bits are valid, transmitting the protocol data unit set to a second user equipment based, at least partially, on the one or more application controlled bits; and in response to a determination that the one or more application controlled bits are invalid, transmitting the protocol data unit set to a second user equipment based, at least partially, on the one or more network controlled bits.

In accordance with one example embodiment, a non-transitory computer-readable medium comprising instructions stored thereon which, when executed with at least one processor, cause the at least one processor to: cause receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; determine whether the one or more application controlled bits are valid; in response to a determination that the one or more application controlled bits are valid, cause transmitting of the protocol data unit set to a second user equipment based, at least partially, on the one or more application controlled bits; and in response to a determination that the one or more application controlled bits are invalid, cause transmitting of the protocol data unit set to a second user equipment based, at least partially, on the one or more network controlled bits.

In accordance with one example embodiment, a non-transitory computer-readable medium comprising program instructions stored thereon for performing at least the following: causing receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; determining whether the one or more application controlled bits are valid; in response to a determination that the one or more application controlled bits are valid, causing transmitting of the protocol data unit set to a second user equipment based, at least partially, on the one or more application controlled bits; and in response to a determination that the one or more application controlled bits are invalid, causing transmitting of the protocol data unit set to a second user equipment based, at least partially, on the one or more network controlled bits.

In accordance with another example embodiment, a non-transitory program storage device readable by a machine may be provided, tangibly embodying instructions executable by the machine for performing operations, the operations comprising: causing receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; determining whether the one or more application controlled bits are valid; in response to a determination that the one or more application controlled bits are valid, causing transmitting of the protocol data unit set to a second user equipment based, at least partially, on the one or more application controlled bits; and in response to a determination that the one or more application controlled bits are invalid, causing transmitting of the protocol data unit set to a second user equipment based, at least partially, on the one or more network controlled bits.

In accordance with another example embodiment, a non-transitory computer-readable medium comprising instructions that, when executed by an apparatus, cause the apparatus to perform at least the following: causing receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; determining whether the one or more application controlled bits are valid; in response to a determination that the one or more application controlled bits are valid, causing transmitting of the protocol data unit set to a second user equipment based, at least partially, on the one or more application controlled bits; and in response to a determination that the one or more application controlled bits are invalid, causing transmitting of the protocol data unit set to a second user equipment based, at least partially, on the one or more network controlled bits.

A computer implemented system comprising: at least one processor and at least one non-transitory memory storing instructions that, when executed by the at least one processor, cause the system at least to perform: causing receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; determining whether the one or more application controlled bits are valid; in response to a determination that the one or more application controlled bits are valid, causing transmitting of the protocol data unit set to a second user equipment based, at least partially, on the one or more application controlled bits; and in response to a determination that the one or more application controlled bits are invalid, causing transmitting of the protocol data unit set to a second user equipment based, at least partially, on the one or more network controlled bits.

A computer implemented system comprising: means for causing receiving, from a first user equipment, of at least one real-time transport protocol header extension configured to handle at least one protocol data unit, wherein the at least one real-time transport control protocol transmission may comprise, at least, one or more application controlled bits and one or more network controlled bits, wherein the one or more application controlled bits may comprise bits that do not overlap with the one or more network controlled bits; means for determining whether the one or more application controlled bits are valid; means for in response to a determination that the one or more application controlled bits are valid, causing transmitting of the protocol data unit set to a second user equipment based, at least partially, on the one or more application controlled bits; and means for in response to a determination that the one or more application controlled bits are invalid, causing transmitting of the protocol data unit set to a second user equipment based, at least partially, on the one or more network controlled bits.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one memory storing instructions that, when executed by the at least one processor, cause the apparatus at least to:
   receive, from a first user equipment, at least one real-time transport protocol header extension configured to handle at least one protocol data unit, wherein the at least one real-time transport protocol header extension comprises, at least, one or more application controlled bits;
   determine whether the one or more application controlled bits are valid; and
   set values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

2. The apparatus of claim 1, wherein the one or more network controlled bits comprise at least one of:
   an indication of validation performed or not performed,
   an indication of whether the one or more application controlled bits are valid or invalid,
   an indication of protocol data unit handling priority determined with a network element,
   an indication of a network congestion status, or
   an indication of a network action.

3. The apparatus of claim 1, wherein the at least one memory stores instructions that, when executed by the at least one processor, cause the apparatus to:
   transmit, to a second user equipment, the at least one real-time transport protocol header extension.

4. The apparatus of claim 1, wherein the at least one memory stores instructions that, when executed by the at least one processor, cause the apparatus to:
   perform protocol data unit handling prioritization based on the one or more application controlled bits in response to a determination that the one or more application controlled bits are valid.

5. The apparatus of claim 1, wherein the at least one memory stores instructions that, when executed by the at least one processor, cause the apparatus to:
   perform protocol data unit handling prioritization based on the one or more network controlled bits in response to a determination that the one or more application controlled bits are invalid.

6. The apparatus of claim 1, wherein the at least one memory stores instructions that, when executed by the at least one processor, cause the apparatus to:
   discard the at least one protocol data unit in response to a determination that the one or more application controlled bits are invalid.

7. The apparatus of claim 1, wherein the at least one memory stores instructions that, when executed by the at least one processor, cause the apparatus to:
   forward the at least one protocol data unit in response to a determination that the one or more application controlled bits are invalid.

8. The apparatus of claim 1, wherein the values for the one or more network controlled bits are configured to indicate that the one or more application controlled bits are invalid.

9. The apparatus of claim 1, wherein the at least one memory stores instructions that, when executed by the at least one processor, cause the apparatus to:
   determine that the one or more application controlled bits are valid;
   determine to at least one of:
   drop transmission of the at least one protocol data unit, or
   delay the transmission of the at least one protocol data unit; and
   cause transmission, to the first user equipment, of an indication of dropping or delaying the transmission of the at least one protocol data unit.

10. The apparatus of claim 1, wherein the at least one memory stores instructions that, when executed by the at least one processor, cause the apparatus to:
    determine that at least one of the one or more application controlled bits are invalid; and
    rewrite the at least one application controlled bit.

11. The apparatus of claim 1, wherein the at least one memory stores instructions that, when executed by the at least one processor, cause the apparatus to:

transmit, to a second user equipment, the one or more application controlled bits and the one or more network controlled bits without the at least one protocol data unit.

12. A method comprising:

receiving, from a first user equipment, at least one real-time transport protocol header extension configured to handle at least one protocol data unit, wherein the at least one real-time transport protocol header extension comprises, at least, one or more application controlled bits;

determining whether the one or more application controlled bits are valid; and setting values for one or more network controlled bits of the at least one real-time transport protocol header extension based, at least partially, on a determination of whether the one or more application controlled bits are valid, wherein the one or more application controlled bits comprise bits that do not overlap with the one or more network controlled bits.

13. An apparatus comprising:

at least one processor; and at least one memory storing instructions that, when executed by the at least one processor, cause the apparatus at least to:

receive, from a first user equipment, at least one real-time transport protocol header extension configured to handle at least one protocol data unit, wherein the at least one real-time transport protocol header extension comprises, at least, one or more application controlled bits and one or more network controlled bits, wherein the one or more application controlled bits comprise bits that do not overlap with the one or more network controlled bits;

determine whether the one or more application controlled bits are valid;

in response to a determination that the one or more application controlled bits are valid, transmit the at least one protocol data unit to a second user equipment based, at least partially, on the one or more application controlled bits; and in response to a determination that the one or more application controlled bits are invalid, transmit the at least one protocol data unit to a second user equipment based, at least partially, on the one or more network controlled bits.

14. The apparatus of claim 13, wherein the one or more network controlled bits comprise at least one of:

an indication of validation performed or not performed, an indication of whether the one or more application controlled bits are valid or invalid, an indication of protocol data unit handling priority determined with a network element, an indication of a network congestion status, or an indication of a network action.

15. The apparatus of claim 13, wherein the at least one memory stores instructions that, when executed by the at least one processor, cause the apparatus to:

determine that the one or more application controlled bits are invalid based, at least partially, on the one or more network controlled bits.

* * * * *